(12) United States Patent
Prawitz et al.

(10) Patent No.: US 11,068,766 B2
(45) Date of Patent: Jul. 20, 2021

(54) ENROLMENT CASE FOR SMART CARD

(71) Applicant: IDEMIA IDENTITY & SECURITY FRANCE, Courbevoie (FR)

(72) Inventors: Nicolas Prawitz, Courbevoie (FR); Patrick Bauban, Courbevoie (FR); Joël-Yann Fourre, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 0 days.

(21) Appl. No.: 16/860,571

(22) Filed: Apr. 28, 2020

(65) Prior Publication Data
US 2020/0349408 A1 Nov. 5, 2020

(30) Foreign Application Priority Data
May 3, 2019 (FR) ...................................... 1904662

(51) Int. Cl.
| | |
|---|---|
| *G06K 5/00* | (2006.01) |
| *G06K 19/07* | (2006.01) |
| *G06F 21/32* | (2013.01) |
| *G06K 19/04* | (2006.01) |
| *G06K 19/073* | (2006.01) |
| *G06Q 20/32* | (2012.01) |
| *G07F 7/08* | (2006.01) |

(52) U.S. Cl.
CPC ......... *G06K 19/0718* (2013.01); *G06F 21/32* (2013.01); *G06K 19/042* (2013.01); *G06K 19/07354* (2013.01); *G06Q 20/325* (2013.01); *G07F 7/0873* (2013.01)

(58) Field of Classification Search
CPC .... G06Q 20/3278; G06Q 20/20; G06Q 20/40; G06Q 20/327

USPC ................................ 235/380, 487, 492, 486
See application file for complete search history.

(56) References Cited

U.S. PATENT DOCUMENTS

| | | | | |
|---|---|---|---|---|
| 5,380,695 A | * | 1/1995 | Chiang .................... | B41M 3/14 |
| | | | | 503/227 |
| 6,843,422 B2 | * | 1/2005 | Jones ....................... | B23C 5/10 |
| | | | | 235/380 |

(Continued)

FOREIGN PATENT DOCUMENTS

| | | |
|---|---|---|
| EP | 1 222 623 | 7/2002 |
| WO | WO 01/24109 | 4/2001 |

OTHER PUBLICATIONS

French Search Report, FR 1904662, dated Oct. 2, 2019.

(Continued)

*Primary Examiner* — Daniel St Cyr
(74) *Attorney, Agent, or Firm* — Nixon & Vanderhye

(57) ABSTRACT

Disclosed is a semi-rigid enrolment case for a smart card, formed by folding and gluing an envelope-like cardboard blank of the dimensions of the card. The case includes an electrical circuit printed directly on the cardboard of an inner surface. The circuit includes contact studs connected to a power supply interface and arranged to connect electrical contacts of the card to the power supply interface when the card is inserted into the case. A biometric sensor of the card remains accessible to the user when it is out of the case for making the enrolment. Through-openings are made in the cardboard on either side of contact stud lines and allow forming independent flexible areas, providing better contact between the studs and the electrical contacts of the card.

20 Claims, 18 Drawing Sheets

(56) References Cited

U.S. PATENT DOCUMENTS

| | | | | |
|---|---|---|---|---|
| 8,240,022 | B2* | 8/2012 | Finn | G06K 19/0775 |
| | | | | 29/592.1 |
| 9,900,984 | B2* | 2/2018 | Ho | H04B 1/3816 |
| 10,664,737 | B2* | 5/2020 | Fischer | G07F 7/0806 |
| 10,694,361 | B2* | 6/2020 | Lenchner | H04B 5/0031 |
| 2004/0096250 | A1* | 5/2004 | Kito | G03G 15/2064 |
| | | | | 399/341 |
| 2006/0198987 | A1* | 9/2006 | Grob | B32B 27/10 |
| | | | | 428/137 |
| 2007/0181875 | A1* | 8/2007 | Yamazaki | H01L 24/97 |
| | | | | 257/40 |
| 2011/0272464 | A1* | 11/2011 | Rancien | G06K 19/07327 |
| | | | | 235/488 |
| 2018/0276518 | A1 | 9/2018 | Benkley, III et al. | |
| 2019/0376234 | A1* | 12/2019 | Mallya | D21H 21/22 |

OTHER PUBLICATIONS

Caruso Francesco et al: "High-throughput shadow mask printing of passive electrical components on paper by supersonic cluster beam deposition", Applied Physics Letters, A I P Publishing LLC, US, vol. 108, No. 16, Apr. 18, 2016 (Apr. 18, 2016), XP012207002, ISSN: 0003-6951, DOI: 10.1063/1.4947281 [extrait le Jan. 1, 1901]* abrege ** p. 1 *.

Claudia Daud~N Roquet et al: "3D Folded PrintGami", Designing Interactive Systems, ACM, 2 Penn Plaza, Suite 701 New York NY 10121-0701, USA, Jun. 4, 2016 (Jun. 4, 2016), pp. 187-191, XP058259394, DOI: 10.1145/2901790.2901891, ISBN: 978-1-4503-4031-1, * p. 1, ligne 1—p. 2, ligne 11 *.

* cited by examiner

ENROLMENT CASE FOR SMART CARD

TECHNICAL FIELD

The present invention relates to the field of cases for integrated circuit cards, also known as smart cards.

PRIOR ART

Many smart cards are used as means for secure access to services, such as payment or transport services. If traditionally the authentication of the user was carried out through the entry of a personal code, generally a PIN (Personal Identification Number) code, an increasing number of smart cards, called biometric cards, now integrates one or more biometric sensor(s) for acquiring a biometric data (or sample) of the cardholder to authenticate him/her.

For example, there are payment smart cards equipped with a fingerprint sensor. Instead of indicating his/her secret code, the cardholder places his thumb on the sensor once the card is inserted into the contact payment terminal or when the card is approached to the contactless payment terminal. The cardholder can thus be authenticated.

The cardholder of a biometric card must generally proceed to an initial (and generally unique) operation for acquiring his/her own biometric data (or enrolment step), typically one or several fingerprint(s), as reference data with which new data acquired by the biometric sensor will be compared subsequently for authentication purposes.

The publication US 2018/276518 proposes, in particular in its FIG. 9, cases that are source of electrical energy and usable for this phase of enrolment of biometric cards with fingerprint sensors. The cases are made of injection molded plastic. Eight contacts corresponding to the contacts of the card must be added to the plastic casing and metal connecting plates must be provided to connect the two power contacts to an on-board cell. The enrolment mode of the biometric card can be automatically triggered during a first power supply of the card.

These cases are unsatisfactory for various reasons: too expensive because of the manufacturing method, too bulky, environmentally damaging and too vulnerable to hard impacts because of the use of hard and brittle plastic, too complex because they require the addition of metal connecting plates. In addition, their manufacturing method is long due to the molding of the plastic.

DISCLOSURE OF THE INVENTION

The present invention aims at overcoming all or part of these drawbacks by proposing a new type of smart card case.

It provides in particular a case for a smart card formed of an envelope made of cellulosic fiber material with dimensions that allow inserting a smart card therein through a slot, the envelope comprising an electrical circuit deposited directly on the cellulosic fiber material which electrically connects electrical contacts of the card to a power supply interface when the card is inserted into a first position.

The power supply interface is in particular part of the electrical circuit.

The materials made of cellulosic, preferably plant, fibers are typically cardboard or paper. A sufficient grammage is taken to obtain a semi-rigid, that is to say, self-supporting (without breaking or folding) case when the card is inserted therein.

Many techniques of depositing conductive inks on a support made of cellulosic fibers, for example ink-jet printing, make it possible to produce this case quickly and at a lower cost. This also results in reduced thicknesses of the case.

Advantageously, the case according to the invention is mainly composed of recyclable materials.

Finally, the natural elasticity of the material used makes the case resistant to abrupt and sharp impacts.

This case can be used in a process of enrolment of a biometric smart card because it allows powering the smart card to allow the acquisition of the reference biometric data.

The invention therefore also provides a system including such a case and a smart card equipped with a biometric sensor provided on the surface of the card (e.g. flush with the surface), the biometric sensor being accessible from the outside of the case when the smart card is inserted into the first position. This allows carrying out the biometric data acquisition steps.

In use, the power supply interface is connected to an electrical source internal to the case (for example an on-board cell) or external to the case (for example a device having a connection port intended to be coupled with the power interface, such as a USB port).

Optional characteristics of embodiments of the invention are defined in the dependent claims.

In one embodiment, the electrical circuit is deposited on an internal face of the envelope, the power supply interface may have a portion external to the envelope.

In one embodiment, the electrical circuit includes several contact studs arranged in one or several contact position(s) of a matrix pattern (i.e. in lines and columns) to make electrical contact with the inserted card (in the first position), the envelope including at least one through-opening arranged between two contact positions of the matrix pattern. The matrix pattern generally corresponds to the arrangement of contact pads on the card.

The studs form an extra thickness relative to the electrical track forming the circuit. It may be droplets of conductive material.

In practice, two studs connected to the power supply interface may be provided to power the card. One or other stud(s) may be provided so that the card, in the execution of an enrolment routine for example, drives the activation of components of the electrical circuit forming the user interface, typically LEDs (Light-Emitting Diodes), a loudspeaker, haptic feedback, a screen.

With this arrangement, the studs arranged at the contact positions separated by the opening made in the envelope can move independently thanks to the elasticity of the material used. A similar dimensioning of these studs is therefore no longer necessary to ensure electrical contact with the card, reducing the manufacturing constraints (a greater tolerance is accepted). In the end, a better electrical contact is achieved with the inserted card.

According to one characteristic, the envelope includes a plurality of openings each arranged between two successive rows (lines or columns) of the matrix pattern carrying contact studs. Thus, successive lines or columns of the matrix pattern are separated two by two by these openings. They define independent flexible areas.

For example two elongate openings may be provided between three successive lines of the pattern carrying contact studs, typically corresponding to the contacts c1-c3 and c5-c7 according to the standard ISO/IEC 7816-2. This makes the movement of the three lines independent for a better contact of the card with the corresponding studs.

According to one characteristic, the envelope further includes one or several (typically two) end opening(s)

arranged externally to the entire matrix pattern carrying contact studs. The end openings may be parallel to the openings of said plurality or alternatively perpendicular thereto.

In the example above, four elongate openings provided on either side of the three successive lines may arise. The studs of the two (among the three) external lines can thus move more easily relative to the body of the envelope. Again, this improves the electrical contact with the card.

An elongate opening may be an opening extending over a distance greater than or equal to a length encompassing the two end contact positions of the same line.

The openings made may have the same shapes and dimensions.

For example, the matrix pattern is formed of two columns of four lines in accordance with the standard ISO/IEC 7816-2: 2007. In this case, the external edges of the two contacts of a line are at least 9.62 mm apart. The length of the elongate opening may be provided greater than this value, for example substantially of the corresponding length of the contact area flush with the card, in particular between 12 and 20 mm.

The width of the opening may be, for its part, comprised between 0.1 and 1 mm, typically between 0.3 and 0.8 mm. This allows in particular effectively using the space provided between the contact positions of two different lines, typically 0.84 mm in the aforementioned standard.

In one embodiment, the electrical circuit consists of one or several conductive track portion(s) deposited on the envelope, of one or several component(s) (e.g. LEDs) forming the user interface and optionally of an energy source. This simple constitution of the electrical circuit allows a less complex manufacture at a lower cost.

In one embodiment, the envelope made of cellulosic fiber material is formed in one part. This part or "blank" is thus folded and glued, if necessary, to form the envelope. Again, this arrangement simplifies the operations and the manufacturing cost.

According to one particular characteristic, the envelope includes means for guiding the card toward the first position, the guide means being formed by flaps fixing together a front panel and a back panel of the envelope. The flaps are typically hingedly connected to one of the panels. In particular, the flaps may have a beveled edge on the side of the insertion slot in order to facilitate the introduction of the card into the case.

The invention thus also relates to a blank made of cellulosic fiber material for a card case, comprising two adjacent and hinged panels intended to form the two faces of a envelope-like case with dimensions that allow inserting a smart card therein through a slot (for example constituted by one side of the envelope), an electrical circuit being deposited directly on the cellulosic fiber material of at least a first one of said panels, the electrical circuit including, on the first panel, contact studs arranged so as to electrically connect electrical contacts of the card to a power supply interface when the card is inserted into a first position in the envelope-like case.

In one embodiment, the contact studs are arranged in one or several contact position(s) of a matrix pattern to make electrical contact with the card inserted into the first position, and the first panel includes at least one opening arranged between two contact positions of the matrix pattern.

Preferably, the first panel includes a plurality of openings each arranged between two successive rows (lines or columns) of the matrix pattern carrying contact studs, and two end openings parallel (alternately perpendicular) to the openings of said plurality and arranged externally to the entire matrix pattern carrying contact studs.

Alternatively, an envelope manufactured from several assembled pieces can be considered.

The invention also relates to a method for manufacturing a case for a smart card, comprising the following steps:

forming a blank made of cellulosic fiber material, comprising two adjacent and hinged panels intended to form the two faces of an envelope-like case with dimensions that allow inserting a smart card therein through a slot (for example constituted by one side of the envelope), an electrical circuit being deposited directly on the cellulosic fiber material of at least a first one of said panels, the electrical circuit including, on the first panel, contact studs connected to a power supply interface, obtaining the envelope-like case by folding and gluing the blank so that the contact studs electrically connect electrical contacts of a card to the power supply interface when the card is inserted into a first position in the envelope-like envelope.

The blank may comprise means relating to the elements described above in relation to the smart card case, typically flaps that allow closing the case blank and that can serve as means for guiding/abutting the card during its insertion.

BRIEF DESCRIPTION OF THE DRAWINGS

Other features and advantages of the invention will become apparent in the description below, illustrated by the appended figures that illustrate exemplary embodiments without any limitation.

FIG. 11b FIG. 11b illustrates, in front view, the enrolment case of FIG. 11a.

DETAILED DESCRIPTION

Figure 1:
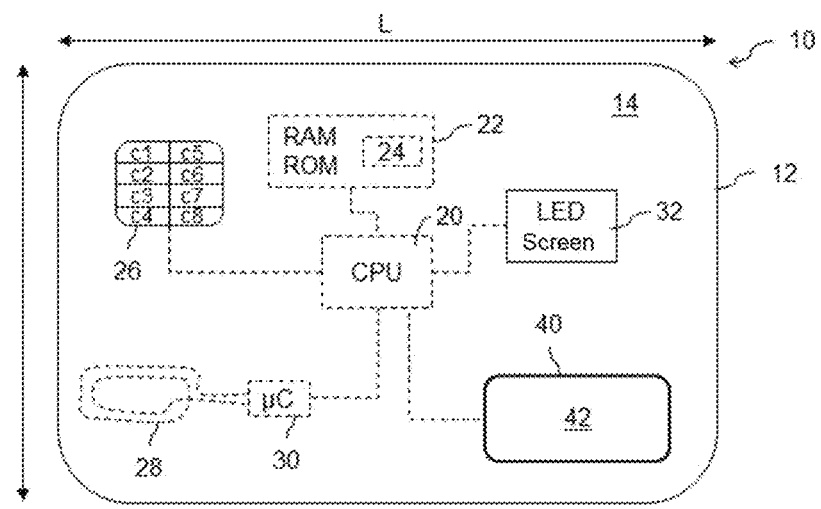
FIG. 1 illustrates a first example of a smart card.

FIG. 1 shows a smart card 10 which constitutes an example of an integrated circuit card. In this example, the components represented in dotted lines are generally hidden in the card body 12 while the components represented in solid lines are visible.

The card can be intended for access to services (payment, telephone, transport).

The smart card 10, of width 1 and length L, therefore includes a card body 12 made of plastic, a main surface of which (here front face) 14 generally includes graphic printings. The card 10 may be in the format 1FF as defined in the standard ISO/IEC 7810: 2003, ID-1.

The card 10 includes an electronic module 20 and associated memories (RAM, ROM) 22 storing code instructions 24 for the operation of the card, in particular an enrolment program.

It also includes one or several interface(s) for communication with the outside, in particular a set of terminals or contact studs 26 flush with the upper surface 14 and optionally an antenna 28 controlled by a contactless communication microcontroller 30 (NFC type).

The interface 26 is preferably in accordance with the standard ISO/IEC 7816-2, for example in its 2007 version. The interface 26 is composed of eight electrical contacts distributed according to a matrix pattern of two columns of four lines. To each matrix position corresponds an electrical contact position denoted c1 to c8 according to the standard. Traditionally, the contacts c1 and c5 of the first line are used for the purpose of powering the card while the contacts c4 and c8 are not used.

The interface 28-30 complies with the standard ISO/IEC 14443.

When the card 10 is presented to a reader (by contact or without contact), it is powered by the latter via the corresponding interface. The code instructions 24 can then be executed automatically or on command.

The card 10 also includes one or several biometric sensor(s) 40 and optionally one or several user interface(s) 32, typically LEDs and/or a display, to give information to the user about different states or information of the card.

The different components are interconnected by one or several computer bus(es).

The biometric sensor 40 includes an acquisition area 42, generally flush with the upper surface 14 of the card 10.

In the example represented, the biometric sensor 40 is a capacitive fingerprint sensor, for example manufactured according to the method described in the publication FR 3 061 333 A1.

The capacitive sensor 40 is formed of an area 42 of pixels.

Other biometric sensors may be used, for example in a non-exhaustive manner, an optical sensor, a luminescence sensor, a multispectral imaging sensor, a thermal sensor, an ultrasound sensor.

Figure 2:
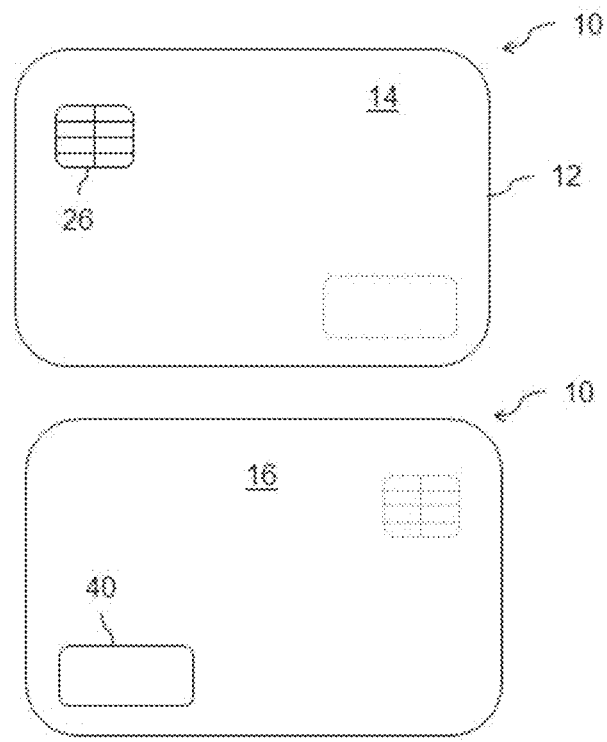
FIG. 2 illustrates a second example of a smart card.

FIG. 2 represents a similar card 10 whose biometric sensor 40 is provided on the rear face 16 (opposite to the main surface 14 carrying the contact pads 26) of the card body 12.

Figure 3:
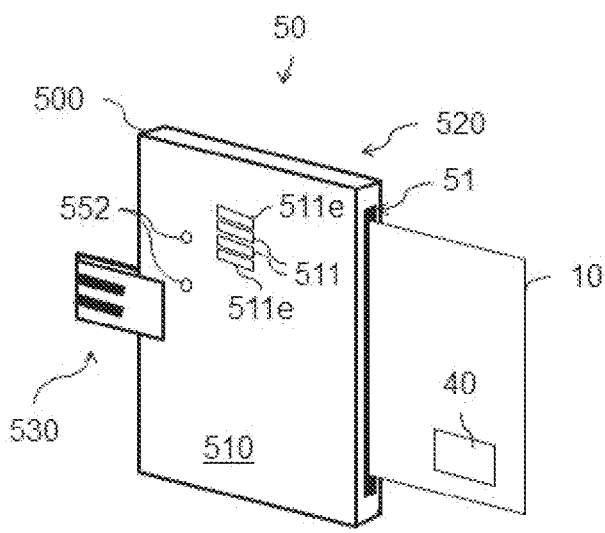
FIG. 3 illustrates an enrolment case for smart cards according to one implementation of the invention.

FIG. 3 shows an enrolment case 50 and a smart card 10 inserted therein through a slot 51. The smart card 10 is in position for the enrolment. Of course, such a case can be used for other operations using the card 10 than the simple enrolment taken here for illustrative purposes.

The case is formed of a semi-rigid envelope 500 made of plant cellulose fiber material, typically cardboard. The envelope is dimensioned to insert the card 10 therein through the slot 51. It is formed of two panels of similar dimensions, the one forming the front face 510 and the other forming the rear face 520, made secured to each other, for example by gluing of flaps on three of their sides. The last side, not glued, is formed by the insertion slot 51.

The panels can be customized on their outer face (as opposed to the inside of the case) by simple printing on the cardboard, in particular the back panel 520, to place therein a logo or instructions to follow for the enrolment operations.

In the enrolment position represented in the Figure, the biometric sensor 40 is accessible from the outside of the case 50 allowing the user to use the sensor during enrolment. In this position, the card 10 can be powered by either an inner or an outer power supply source of 3 to 5V via a power supply interface 530, here represented as a USB male plug extending from one of the glued edges of the envelope 500.

When the case 50 is inserted, via the interface 530, into a corresponding powered socket, the card 10 is powered by means of an electrical circuit deposited directly on the cellulosic fiber material of the envelope which electrically connects electrical contacts 26 of the card 10 to the power supply interface 530 when the card is inserted into the enrolment position.

Figure 4:
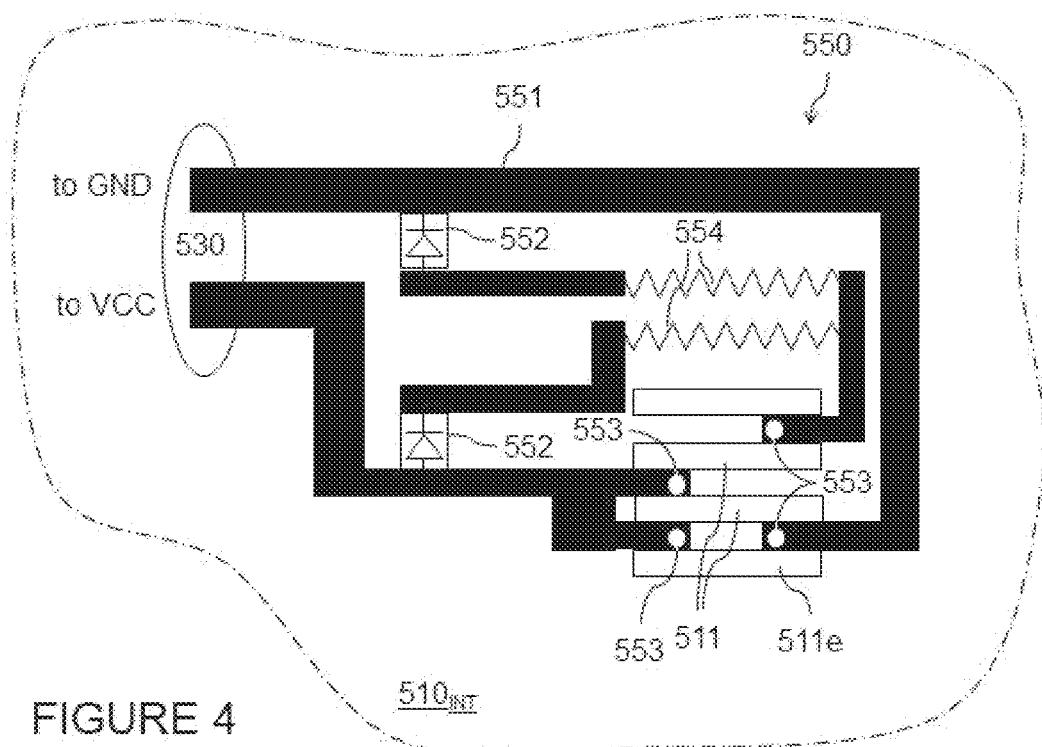
FIG. 4 illustrates one example of an electrical circuit deposited directly on an internal face of the enrolment case to power a smart card introduced therein.

FIG. 4 illustrates one example of electrical circuit 550 allowing this electrical connection between the contacts 26 and the interface 530.

The electrical circuit 550 is printed on the inner or internal face of one of the panels.

FIG. 4 shows the printing on the inner face $510_{INT}$ of the front panel 510. Variants are illustrated below. The electrical circuit 550 consists of conductive track portions (or segments) (black portions) 551 and of electronic components connected to the track, here two LEDs 552.

Figure 4A:
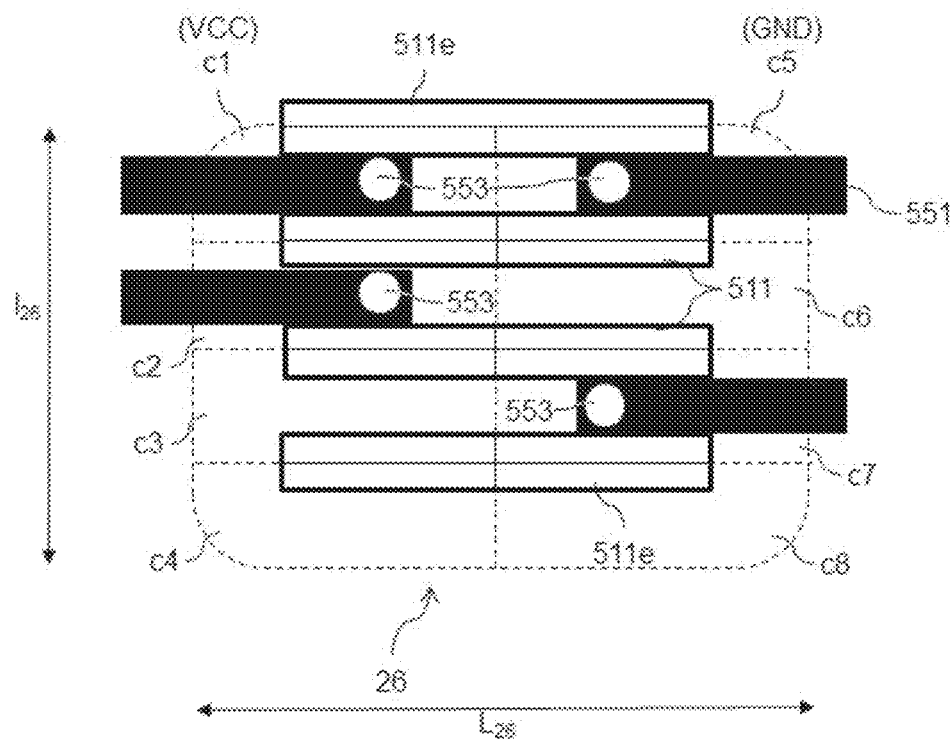
FIG. 4a illustrates the electrical contact between the contact pads of the smart card and studs of the electrical circuit of FIG. 4.

The conductive track portions include several contact studs 553 arranged to make contact with the pads 26 of the card 10 as shown in FIG. 4a (seen through from the outer face of the panel 510) when the card is in the enrolment position. The contact studs 553 may be formed by conductive droplets or crimped rivets (made of conductive material).

As shown in the figure, the studs 553 are arranged in one or several contact position(s) of a matrix pattern. In the example, the pattern used is that of the standard 7816-2: 2007 composed of two columns of four lines, corresponding to the contacts c1 to c8 (contacts represented in dotted lines). The studs 553 facing the contacts c1 and c5 are directly connected to the track portions VCC and GND of the interface 530 for the purpose of powering the card 10 when the case 50 is inserted into a power device via its interface 530.

Other studs 553 (here two studs facing the contacts c2 and c7) can be provided, which allow the enrolment program 24, when it is executed, to control a user interface represented here by the two LEDs 552, also visible on the front panel 510 (see FIG. 3). The user interface 552 can in particular guide the user during the various steps constituting the enrolment operation.

Of course, user interfaces other than LEDs, for example a loudspeaker or haptic components (based on piezoelectric components or PVDF), can be provided.

The conductive track portions also include electrical resistors 554 formed of a conductive track. The length, width, thickness and used material of the conductive track are determined according to the desired electrical resistance characteristics. As illustrated, the electrical resistors 554, formed of the same material as the conductive track portions, have a reduced width (as compared to the adjacent portions 551) and a zigzag shape.

In the example, the resistors 554 connect the stud 553 for the contact c7 to the two LEDs 552. Preferably, the electrical resistors 554 are printed on an area of the envelope 500 which is slightly subjected to mechanical torsion, typically remote from the edges of the envelope. (therefore from the edges of the panels forming the faces of the case).

As indicated above, alternatively to the use of a USB interface 530, the power source may be internal to the case 50. A power supply interface is therefore provided in the circuit, inside the case formed. The power source, typically a battery, can be placed in the case, in contact with the inner power supply interface. In one variant, the case 50 may be provided, on an outer surface of one of the panels 510/520, with a marking indicating where to make a cut-out for introducing a battery therein (for example in the form of a button cell) such that it is in contact with the inner power supply interface.

Figure 5A:
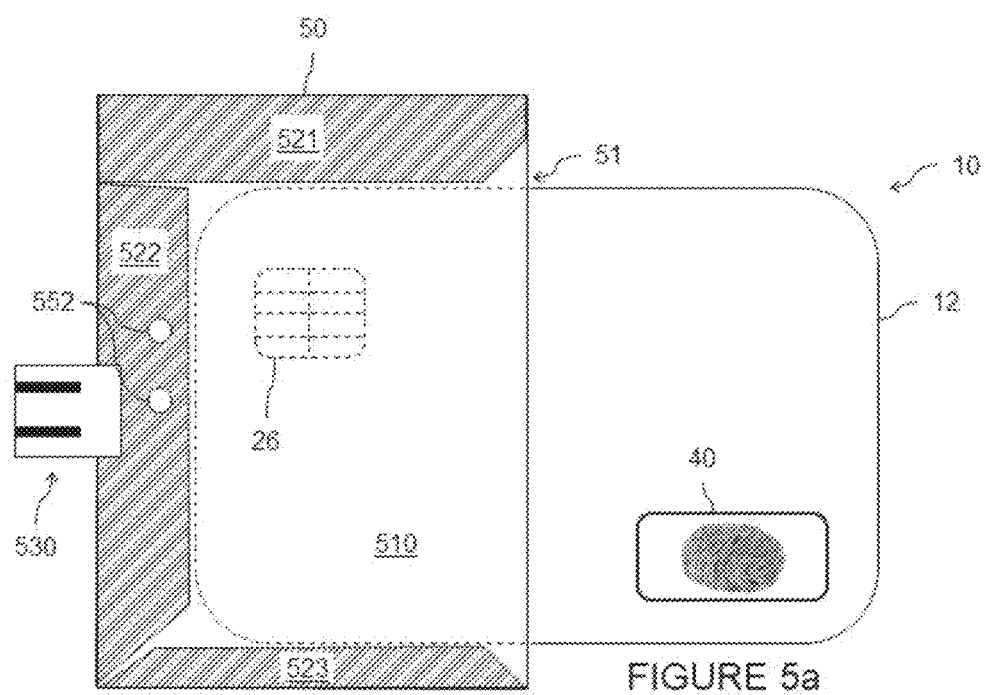
FIG. 5a illustrates a first embodiment of an enrolment case.
Figure 5B:
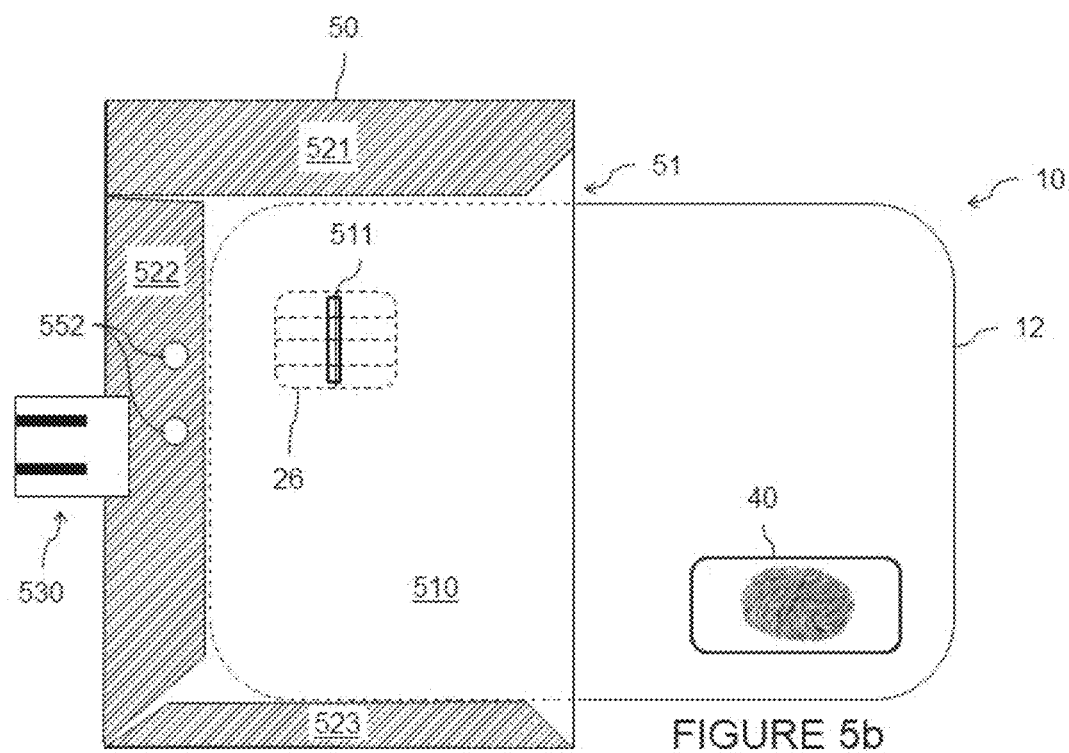
FIG. 5b illustrates a second embodiment of an enrolment case.
Figure 5C:
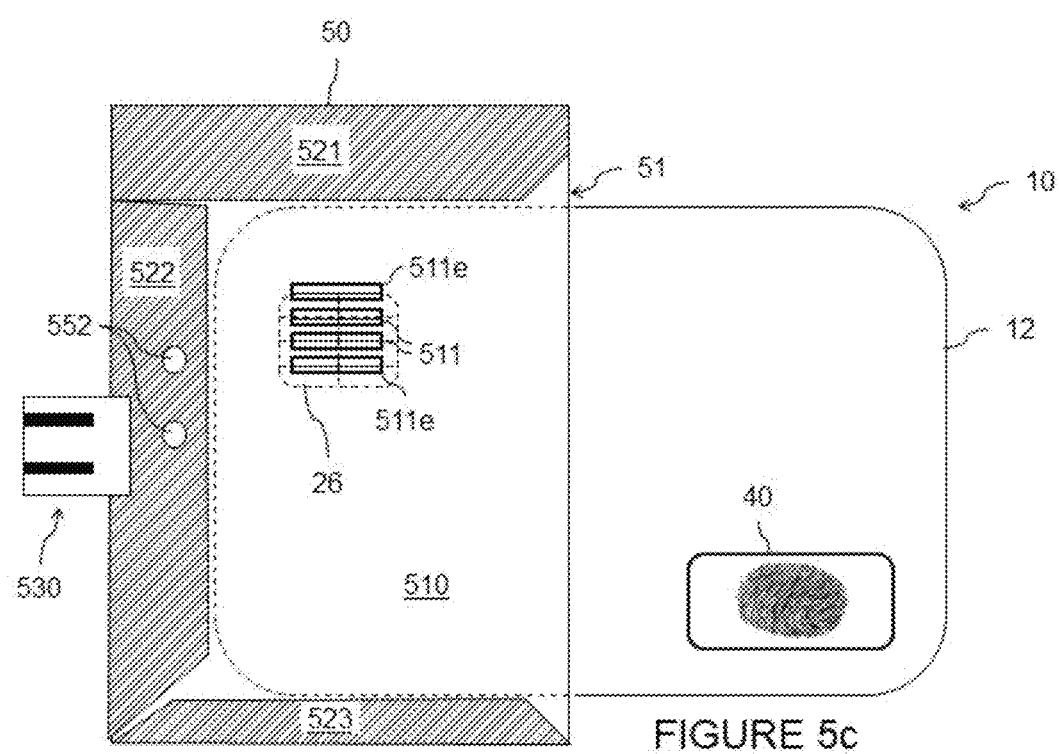
FIG. 5c illustrates a third embodiment of an enrolment case.

FIGS. 5a to 5c illustrate different variants of the enrolment case 50 according to a first embodiment. These cases differ from each other in the number of openings 511 and their arrangement, which are made on the front panel 510 between studs 553 to make the movement of these studs independent and thus ensure better contact with the contact pads 26 of the card. Although these variants are illustrated with a USB interface 530, they also apply to any type of power supply interface.

The electrical circuit 550 and in particular the contact studs 553 are not represented in a transparent manner for a better readability of the figures.

In FIG. 5a, the front panel 510 does not include any opening to the right of the contacts 26 of the card.

In FIGS. 5b and 5c, the front panel 510 of the envelope 500 includes at least one through-opening arranged between two contact positions of the matrix pattern, and between two studs 553.

In the example of FIG. 5b, a single vertical elongate opening 511 separating the studs related to the two contact columns c1-c4 and c5-c8 respectively, is provided. In the example represented, the length of the through-opening 511 is substantially equal to the width $l_{26}$ (or height) of the contact module 26 of the card 10.

In the example of FIG. 5c which corresponds to the case of FIGS. 4 and 4a, the front panel 510 of the envelope includes a plurality of openings 511 each arranged between two successive rows, here lines, of the matrix pattern carrying contact studs. For example in the case of FIG. 4a, studs are provided on the first three lines corresponding to the contacts c1/c5, c2/c6 and c3/c7 (the contacts c4 and c8 remain unused). The openings 511 separate these three lines two by two, giving them relative freedom of movement. Consequently, the cardboard tab between the two openings 511 has improved flexibility, allowing improved contact of the stud(s) it carries.

In addition and optionally, end openings 511e parallel to the openings 511 are provided externally to all three lines of the matrix pattern carrying contact studs. This allows improving the freedom of movement of the two end lines (here those corresponding to c1/c5 and c3/c7) relative to the rest of the front panel 510. In particular, the cardboard tabs between the openings 511 and 511e have improved flexibility, allowing improved contact of the stud(s) they carry.

Each opening 511, 511e is a through-opening.

Each opening 511, 511e has a length greater than the distance between the external edges of the two contacts (for example c1 and c5) of a same line of the pattern according to the aforementioned standard, that is to say greater than 9.62 mm. In the Figure, the length of the openings is smaller than the width of the contact area 26 of the card 10. It may however be greater than or equal to that width. The length of the opening may therefore be greater than 10 mm, preferably between 12 and 20 mm.

Figure 5D:
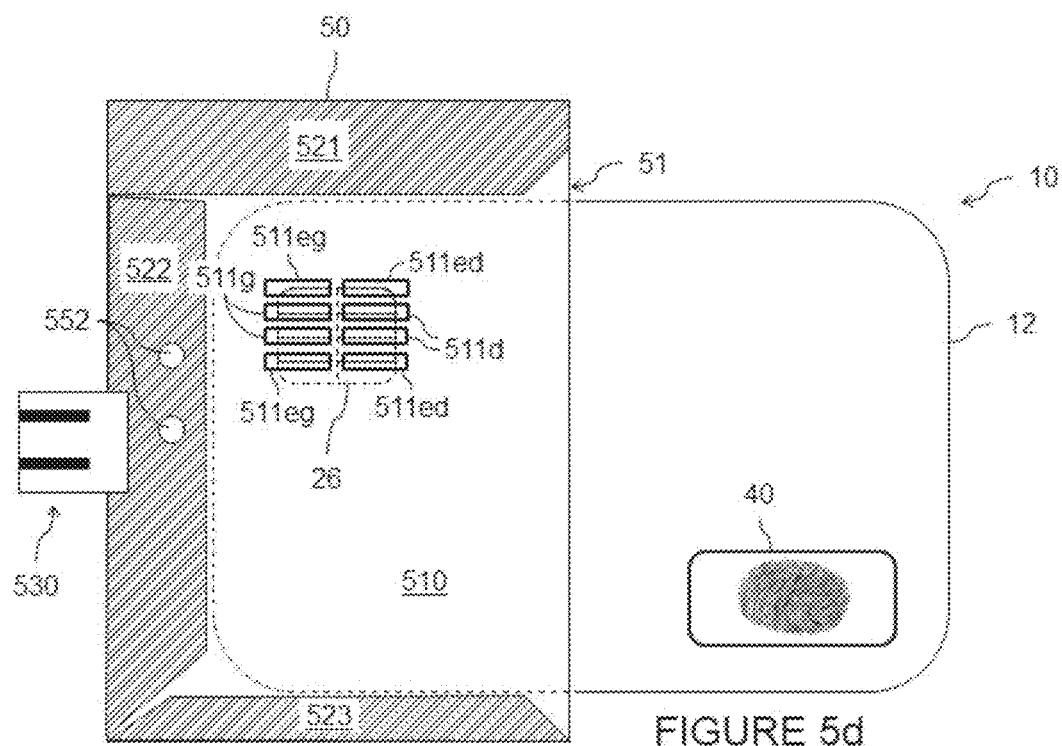
FIG. 5d illustrates a fourth embodiment of an enrolment case.

In the variant represented in FIG. 5d, the plurality of openings includes at least two distinct openings 511g and 511d separating the contact positions of two successive lines (more generally rows, including columns) of the matrix pattern. Similarly, at least two (here two) end openings 511eg and 511ed are provided on the same side externally to the lines of the matrix pattern carrying contact studs. This allows improving the independent flexibility of the contact studs of a same line of the matrix pattern. In the illustrated example, pairs of openings are provided instead of a single opening of FIG. 5c. The uncut central cardboard portion between the openings of a same pair may be of about 1.5 to 2 mm. As a result, the openings 511g, 511d, 511eg and 511ed typically have a length of between 5 and 9.25 mm. In the case of a matrix pattern having more than two contact positions per line, a larger number of openings per line may be provided.

It is possible to mix openings according to FIG. 5c (for example for the end openings 511e) and openings according to FIG. 5d (for example for the openings 511g, 511d between successive lines carrying contact studs).

Each opening 511, 511e, 511g, 511d, 511eg and 511ed has a width smaller than the distance between the center-to-center pitch of two contacts of two consecutive lines (for example c1 and c2) according to the aforementioned standard reduced by half the width of each corresponding stud and the tolerance on the cut-out, that is to say typically of between 0.1 mm and 1 mm.

All the openings made on the same case can have the same dimensions and/or shapes (for example rectangular).

Figure 5E:
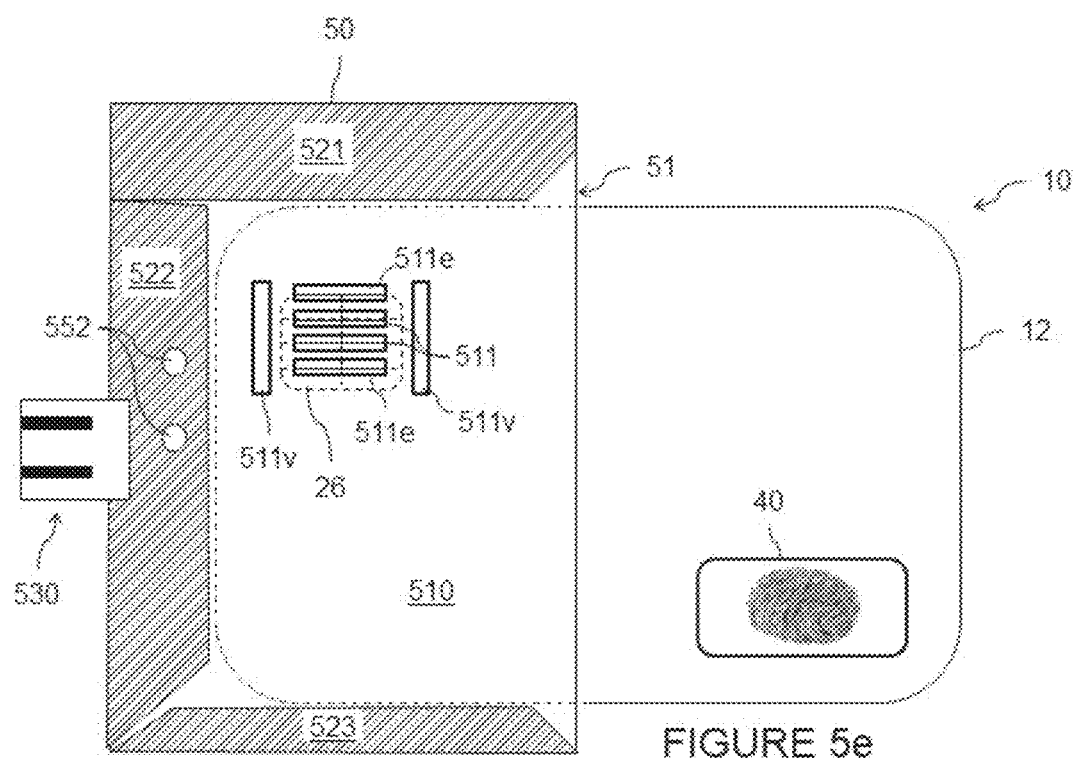
FIG. 5e illustrates a fifth embodiment of an enrolment case.

FIG. 5e illustrates one variant of FIG. 5c where end openings 511v perpendicular (here vertical) to the openings 511 are added externally to the entire matrix pattern carrying the contact studs. The vertical end openings 511v may also be combined with the openings of FIG. 5d and/or in the absence of the parallel end openings 511e, 511ed, 511eg.

These perpendicular openings make it possible to raise, by the mechanical action of the studs 553 on the contacts 26 of the card, the entire area of the panel 510 facing the contacts 26, while guaranteeing the independent flexibility of the various cardboard tabs carrying the studs 533 for better electrical contact.

In one embodiment, the length of the openings 511, 511e is reduced compared to FIG. 5c to position the vertical end openings 511v close to the studs 553. The length of the openings 511, 511e is for example comprised between 12 and 16 mm.

The length of the vertical end openings 511v is of the order of magnitude of the height of the card contact module 26, typically from 8 to 16 mm for the case of the standard ISO/IEC 7816-2: 2007.

FIGS. 5a to 5e show, in crosshatched portions, guides 521, 522, 523 sandwiched between the front panel 510 and the back panel 520. The guides are used to guide the card 10 toward the enrolment position.

The guides 521 and 523 comprise a beveled portion on the side of the slot 51 towards the inside of the case, thus facilitating the insertion of the card 10 into the case 50.

The guide 522 provided at the bottom of the envelope relative to the slot 51 (that is to say on the opposite side) serves as a means for abutting the card 10 in the enrolment position.

These guides may be formed by flaps hinged to one of or both of the panels 510, 520 and fixing together the front panel 510 and the back panel 520.

Advantageously, the thickness of the flaps allows making a spacer between the two panels 510, 520 for the insertion of the card 10. The spacer (ideally formed of a single thickness of cardboard with adhesive) is greater than or equal to the maximum thickness of a card as specified in the aforementioned standard increased by the thickness of the contact studs 530.

The dimensions of the guides are determined so as to allow the correct positioning of the contacts 26 facing the studs 553 in the position of insertion (enrolment) of the card 10.

The dimensions of the panels 510 and 520 (and therefore of the case 50) are chosen so as to allow, in this position of insertion of the card 10, the biometric sensor 40 to be entirely external to the case 50 and thus be easily accessible to the user.

FIGS. 6a to 6d illustrate a method for manufacturing such a case 50 formed in one part, in particular in the version illustrated in FIGS. 4, 4a and 5c. The blank 600, preferably made of cardboard or any recyclable material, is of a thickness comprised between 0.8 and 1.2 mm, allowing to make the desired spacer.

Figure 6A:
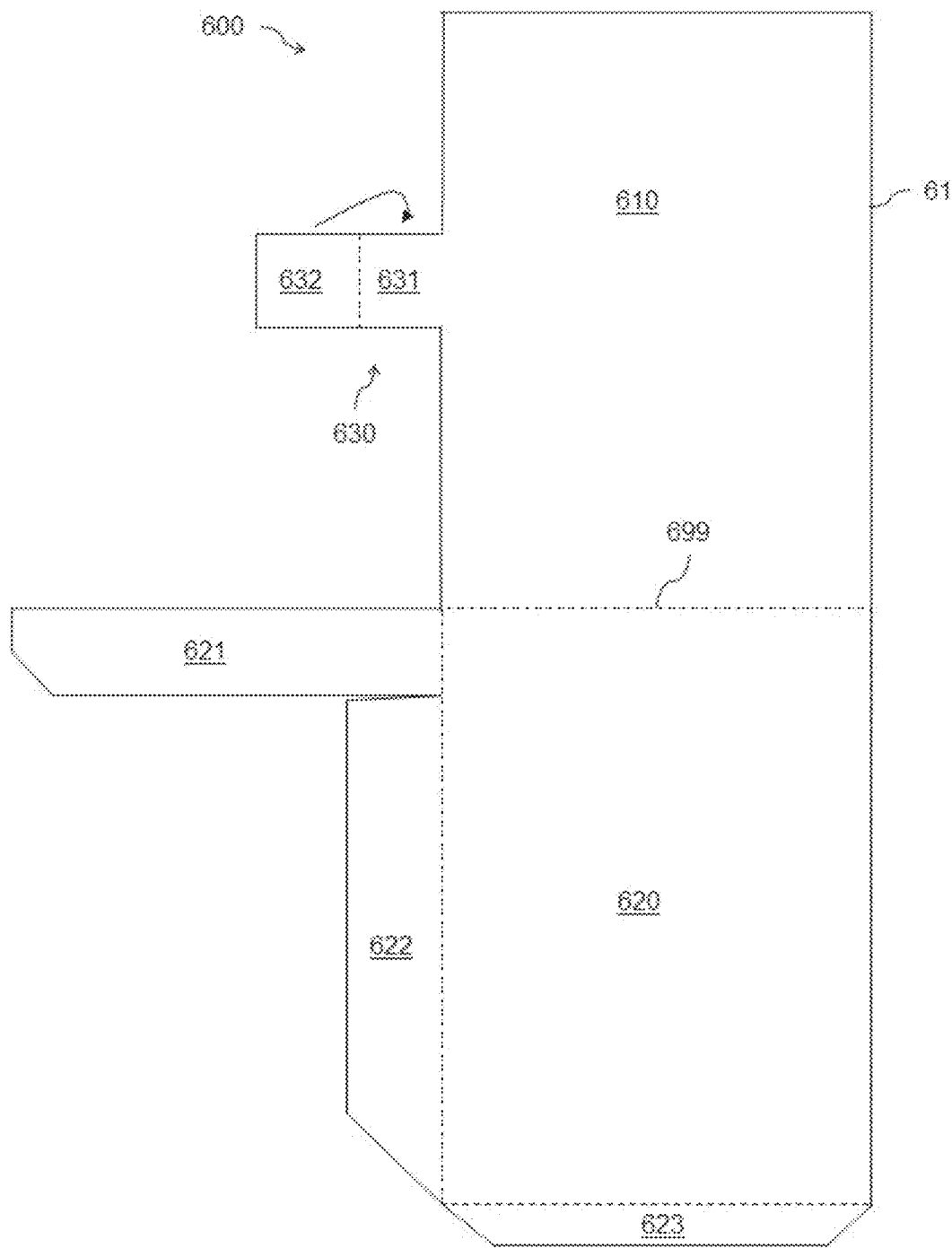
FIG. 6a illustrates the cut-out of a blank for the manufacture according to one embodiment of the invention of an enrolment case.

FIG. 6a shows a clean blank cut into one part from the same cardboard plate. It comprises two adjacent and hinged rectangular panels 610 and 620 intended to form the two faces/panels 510 and 520 of the case 50 when they are folded over each other along a common edge forming the hinge 699 (the hinges are generally represented as broken lines). The edges 61 (panels) orthogonal to the hinge 699 define the edges of the insertion slot 51 when the panels are folded.

A tab 630 formed in one part with the panel 610 extends perpendicularly to the first panel 610 on the edge opposite to the edge 61 forming the slot 51, on a first portion 631 hinged to a longer end portion 632. The two portions 631 and 632 are hinged by a common edge.

The tab 630 is intended to form the power interface 530 (in the case of an outer power source). To do so, the end portion 632 is intended to be folded and glued to the back of the portion 631 in order to impart rigidity to the interface 630. The width of the tab 630 advantageously corresponds to the width of a male plug USB. The thickness of the two glued portions corresponds to the thickness of the inner support of a USB male connector. If this is not the case, other portions, possibly hinged (folded then glued) and formed in the same cardboard part, can be provided to obtain the desired thickness.

The second panel 620 includes three hinged flaps 621, 622, 623 extending on the two edges other than the hinge 699 and the edge 61 forming the slot 51 which, when they are folded, allow maintaining, by gluing (preferably on both sides), the two panels 610 and 620 together to form the case 50 with the desired spacer. In the proposed configuration, these flaps form guides 521, 522, 523 as disclosed above.

The hinge 699 and the hinged flaps 622 and 623 allow closing the blank 600 in an envelope 500 having the desired spacer and a slot 51 formed by the edges 61 of the two panels.

The flap 621 has an edge in the continuity of the hinge 699. This edge is perpendicular to the hinge of the flap 621 with the second panel 620. Thus in the folded position of the flap, this edge aligns with the hinge 699 reinforcing the latter.

The flaps 621 and 623 allow, in particular by their beveled ends on the side of the edge 61 forming the slot 51, facilitating the insertion of the card 10 in the case 50 (see FIG. 5c).

Alternatively, the flaps 621 and 623 may be provided to be connected, hinged, to the first panel 610 in configurations symmetrical (relative to the hinge 699) to what is described above.

Figure 6B:
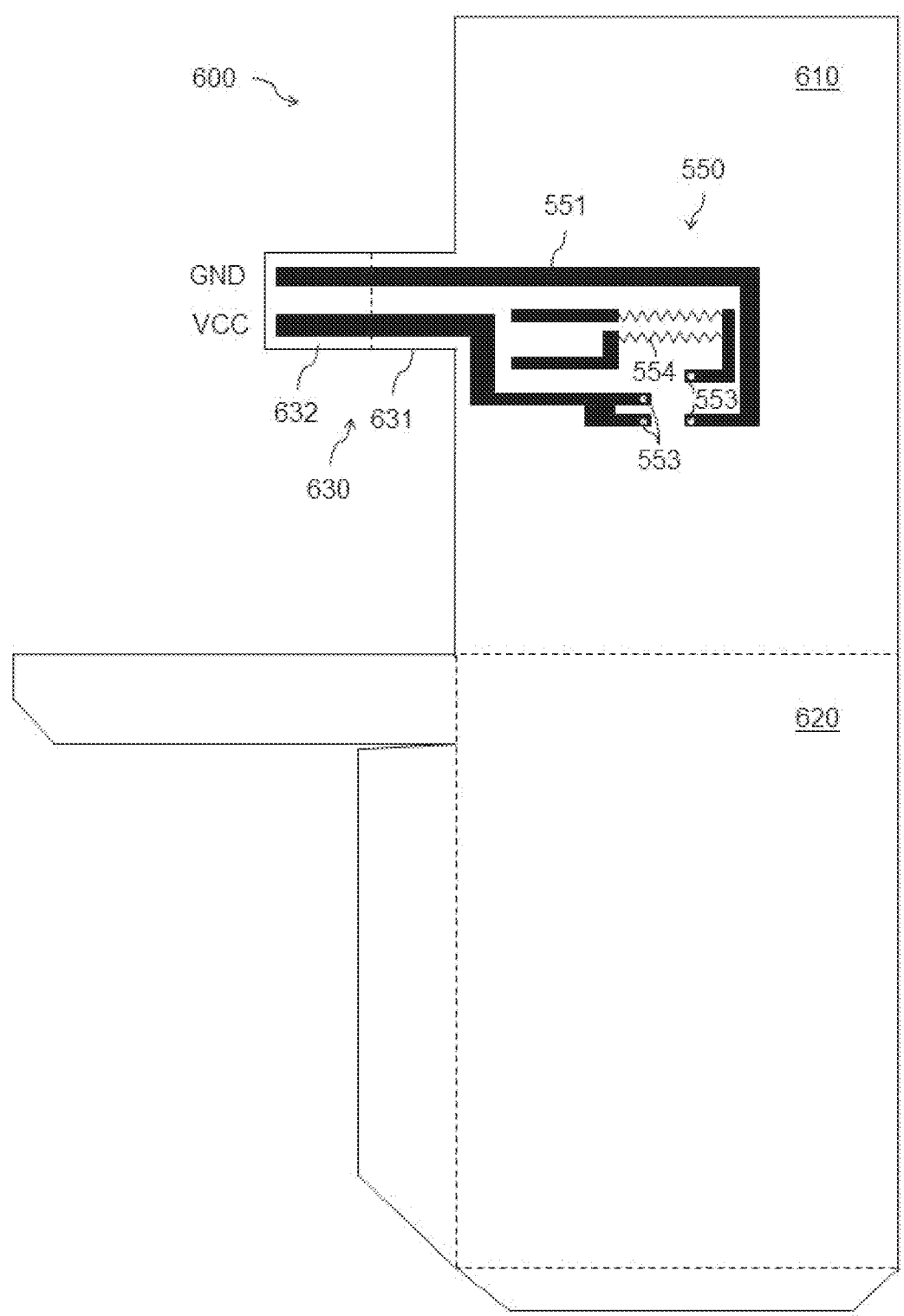
FIG. 6b illustrates the printing of conductive track portions on the blank of FIG. 6a for the manufacture of the enrolment case.

FIG. 6b shows the deposition of the conductive track portions 551 (including the resistors 554) directly on the cardboard blank 600, in particular on only one face of the blank 600, particularly on only one face of the panel 610 intended to form the internal face $510_{INT}$ of the front panel 510. A printing on only one face of the blank has an advantage in terms of design cost.

These track portions 551 are formed at the location provided so that the studs 553 finally formed are positioned to the right of the corresponding contacts 26 of the card 10, when the latter is in the insertion position (see FIG. 4a).

Conventional techniques of additive manufacture of the track portions, typically by ink-jet printing, offset printing, flexographic printing or screen printing, can be used for this deposition. A silver or copper or graphite particle-based conductive ink can be used. For the case of use of a copper-based ink, the deposition of an additional graphite-based layer, for the purpose of protecting the copper track from oxidation, may be envisaged.

Of course, other coating techniques may be used to form the track portions 551.

The power track portions VCC and GND extend up to the portions 631 and 632 of the tab 630 forming the power interface 530. The gap and width of the track portions at this location complies with the desired interface, for example with the USB format. When the end portion 632 is folded and glued to the back of the portion 631, the track portions VCC and GND of the end portion 632 are advantageously oriented on the front face of the case 50 (see FIG. 5c) for making an electrical contact with a USB female socket of an outer source. Thus, when the case is introduced into the port USB of the outer source via its interface 530, the biometric sensor 40 (of FIG. 1) and the LEDs 552 are easily accessible on the top of the card 10 thus positioned in the case 50.

In order to protect the track portions VCC and GND of the first portion 631 (track portions oriented toward the back of the card) forming the power interface 530, it is possible to provide the deposition of an insulating protective layer on the first portion 631 and optionally on the hinge area between the portions 631 and 632. This in particular avoids any short-circuit by conductive elements provided in the USB female socket into which the power interface 530 will be introduced.

The studs 553 are formed at the provided locations, for example by gluing conductive beads using a conductive adhesive, by printing an extra thickness (3D) of conductive material (typically droplets) or by fixing crimped rivets.

Figure 6C:
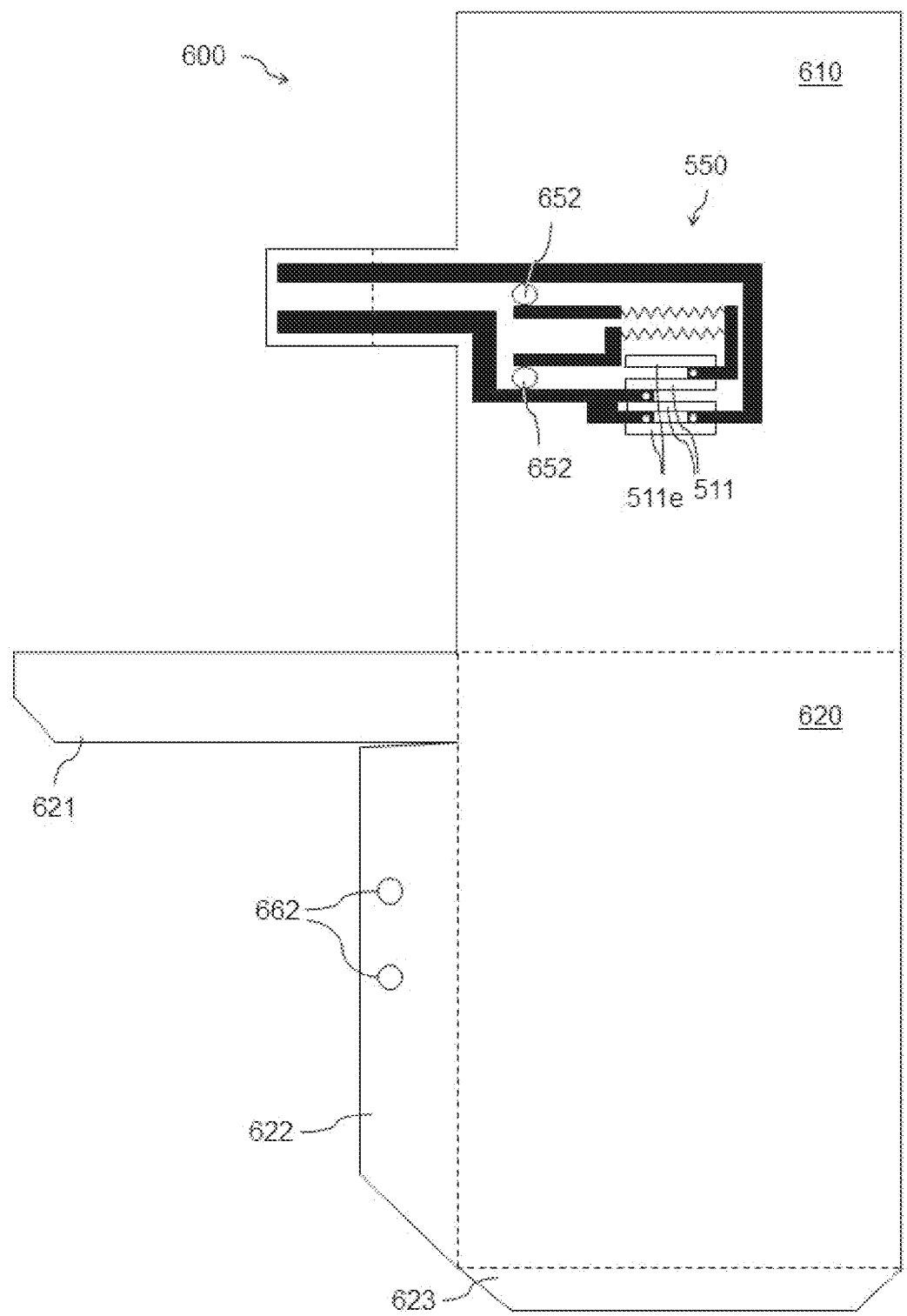
FIG. 6c illustrates the production of openings in the blank of FIG. 6b for the manufacture of the enrolment case in the configuration of FIG. 5c.

FIG. 6c shows the following step of making the through-openings 511, 511e at the proper locations relative to the contacts 26 of a card 10 introduced in the enrolment position. As shown in FIG. 4a, one embodiment provides making four identical rectangular openings on either side of the three lines c1/c5, c2/c6 and c3/c7 of the ISO 7816 format. The cardboard areas carrying the studs 553 facing each of these lines are thus advantageously provided with an elasticity facilitating the electrical contact of the studs with the contacts 26. Of course, other arrangements of openings can be implemented according to the desired case.

Conventional stamping means can be used.

In addition, holes 652 are made in the panel 610 at the locations provided for the LEDs 552. These holes are preferably of smaller diameter than that of the LEDs 552 so that these LEDs are maintained in the envelope 500 by the periphery of the holes.

Clearance holes 662 for the diodes are also provided on the flap 622 to the right of the holes 652 once the flap 622 is folded and the case 50 is formed (FIG. 5c). These holes have a diameter greater than the dimensions of the diodes 552 so as to form a cavity for these diodes in the formed case 50, without them being crushed by the flap 622.

Figure 6D:
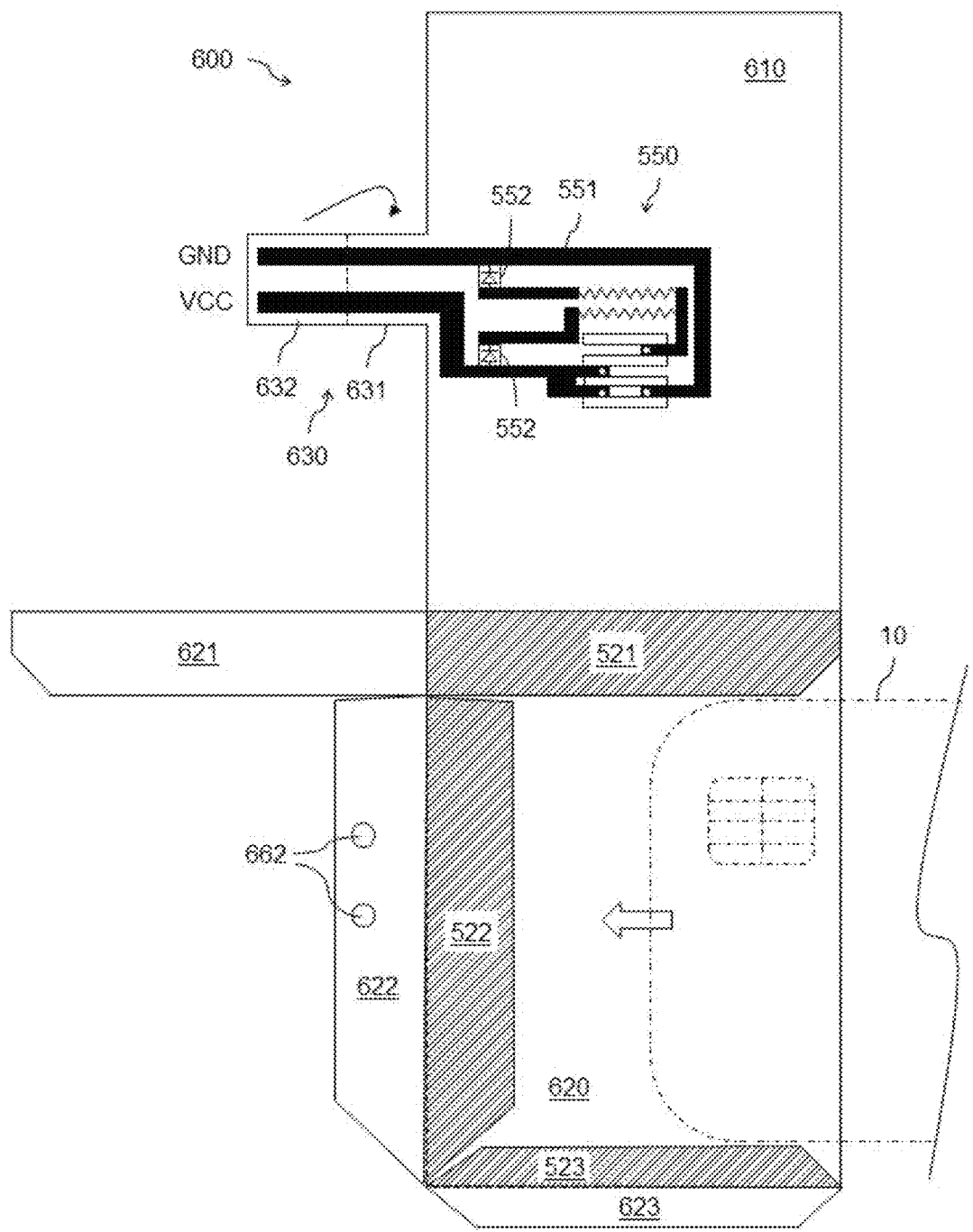
FIG. 6d illustrates the installation of electronic components on the blank of FIG. 6c then its folding and gluing for the manufacture of the enrolment case.

The next step illustrated in FIG. 6d consists of the insertion of the diodes 552 in the circuit 500. For example, the LEDs 552 are glued with a conductive adhesive in order to promote the electrical contact of their terminals with the conductive track portions 551.

Optionally, one drop of epoxy-based resin may be deposited ("globtop" technique) on the diodes 552 to protect them and allow better mechanical strength. Also a filling under or on the diodes 552 using an epoxy resin ("underfill" technique) can be envisaged for better mechanical strength.

The final step then consists in folding and gluing the blank 600 thus produced. In particular:
- the end portion 632 is folded and glued against the first portion 631 by the faces that do not carry the track portions VCC and GND,
- the flaps 621, 622, 623 are folded and glued on the areas 521, 522, 523 respectively (crosshatched portions in FIG. 6d),
- the two panels 610 and 620 are folded and glued together (glued in particular at the areas 521, 522, 523), the diodes 552 engaging the holes 662 of the flap 622.

Thus, the case 50 obtained (FIGS. 3 and 5c) is self-supporting (without breaking or folding) when the card 10 is inserted therein.

Figure 7:
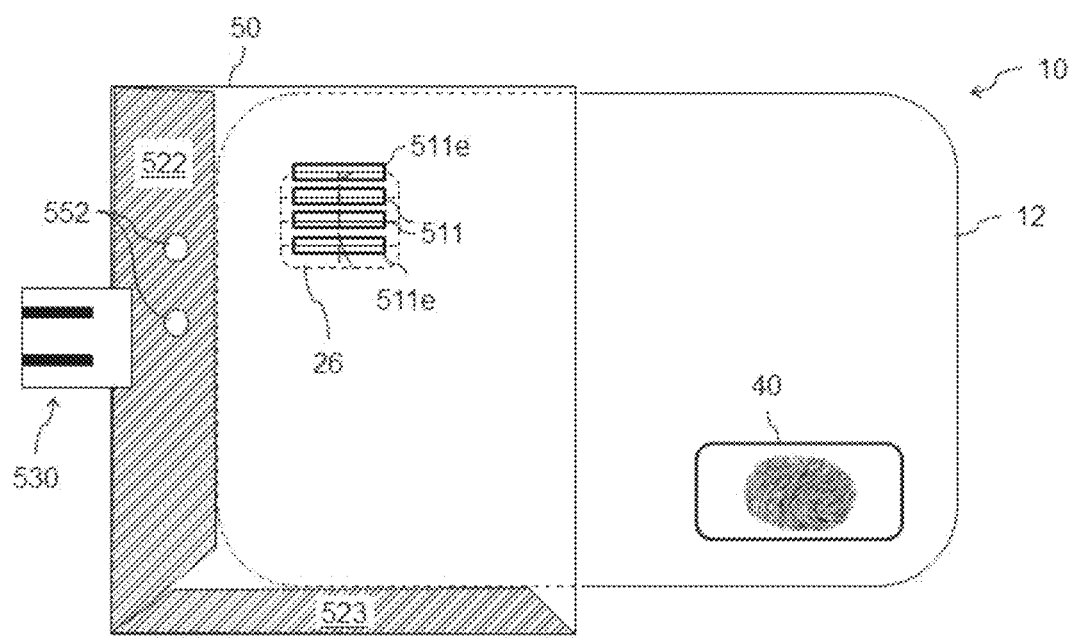
FIG. 7 illustrates one variant of the enrolment case of FIG. 5c without guide flap at the hinge between the panels forming the faces of the case.

FIG. 7 illustrates one variant to FIG. 5c by the presence of the openings 511 and 511e. This variant is also applicable to the cases of FIGS. 5a, 5b, 5d and 5e.

In this variant, the guide flap 621 at the hinge between the panels 610, 620 forming the faces of the case is not provided, making it possible to simplify the steps of designing the blank 600 and the folding and gluing steps to form the case 50. The fold along the edge 699 then performs the guiding function of the card 10 (in addition to the remaining flaps 622 and 623).

FIGS. 8a to 8d illustrate a method for manufacturing this case 50. The explanations provided above in relation to FIGS. 6a to 6d apply except in regard to the flap 621.

Figure 9:
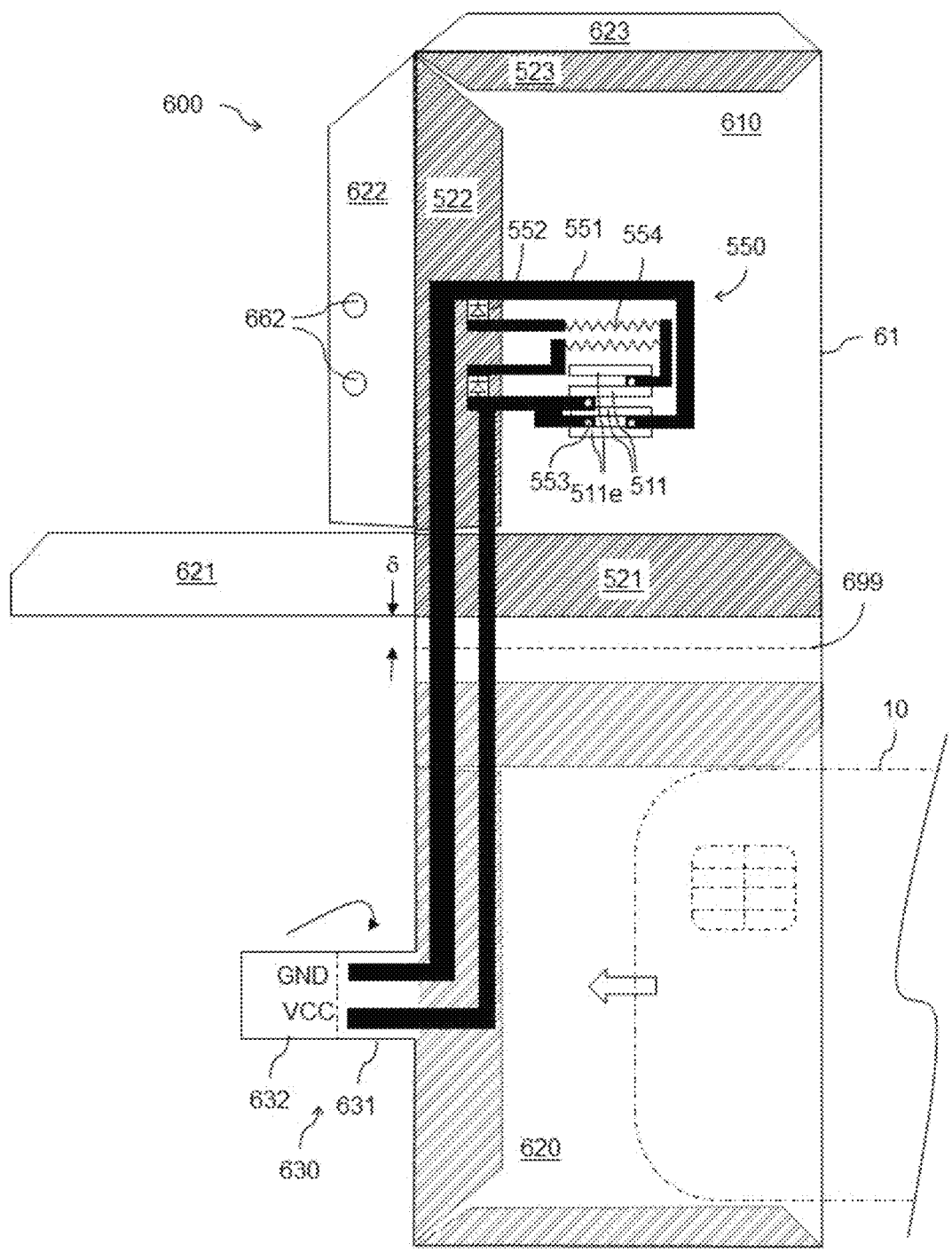
FIG. 9 illustrates one variant of the blank for an enrolment case of FIG. 6d.

FIG. 9 illustrates one variant of FIG. 6d during the process of manufacturing a case 50 in accordance with FIG. 5a, 5b, 5c, 5d or 5c (by adapting the number of openings 511, 511e, 511d, 511g, 511ed, 511eg and their arrangement). The different steps corresponding to FIGS. 6a to 6c are not represented to simplify the presentation. However, they are deduced in the light of FIG. 9.

In this embodiment, the tab 630 forming the power supply interface 530 extends from the second panel 620, similar to what has been described in relation to FIG. 6a.

As a result, the circuit 550 which is mainly printed on the internal face of the first panel 610 is extended by two conductive track portions VCC and GND up to the first portion 631 of the tab 630. This arrangement does not require the extension of these two track portions up to the end portion 632 of the tab because the electrical contact with a female USB socket will be made by the upper area (here visible) of the first tab portion 631. This results in the absence of brittle point of these track portions at the fold between the two portions 631 and 632 of the tab. In addition, it is not necessary to provide an insulating layer on either of the portions in order to avoid short circuits.

The end portion 632 of the tab is intended to be folded and glued to the back of the first portion 631 for the purpose of imparting rigidity and sufficient thickness to the power supply interface 530. Of course, other portions which are folded and glued may be provided, in order to obtain a sufficient number of layers to reach the desired thickness.

The extension of the conductive track portions between the two panels is made on the same face of the two panels 610 and 620, thereby simplifying the manufacturing method.

Since these track portions pass through the fold 699 between the two panels, a stretchable, in particular silver-based, ink is preferably used for their manufacture. This improves the reliability of the conductive track portions. Particularly, these conductive track portions are zigzag printed on the outskirts (only) of the fold, which improves the elastic strength of the ink.

The conductive track portions deposited on the second panel 620 are preferably made in the portion of the panel reserved for the folding and gluing of the flaps 621 and 622 (i.e. the crosshatched areas 521 and 522 in the Figure). In this case, these track portions are not likely to be altered by friction against the card 10 when the latter is introduced into the case 50 formed from the blank 600.

Moreover, the three flaps 621, 622, 623 are always provided to close the case 50 and guide the card 10 introduced therein through the slot 51.

The case 50 bottom flap 622 is connected, hinged, to the first panel 610, because of the presence of the tab 630 on the second panel 620.

The flap 621 may be interchangeably connected, hinged, to the first panel 610 (as illustrated) or to the second panel 620 (as in FIG. 6), in the vicinity of the hinge 699.

Preferably, the flap 621 parallel to the hinge 699 is arranged at a distance 5 from the hinge 699. This allows protecting the conductive track portions printed at the hinge area 699 from a possible conductivity break due to the fold. Indeed, thanks to this spacing 5, the two areas of the same track portion on either side of the hinge 699 are in contact when the two panels 610 and 620 are folded and glued. Optionally, the contact studs may be provided on these track portions in the vicinity of the hinge 699 (on one side or on both sides of the hinge) in order to make the contact of the same track portion on either side of the hinge 699 more reliable.

The flap 623 may be interchangeably connected, hinged, to the first panel 610 (as illustrated) or to the second panel 620 (as in FIG. 6).

The flaps 621 and 623 comprise in particular beveled ends inwardly of the side of the edge 61 forming the slot 51, in order to facilitate the insertion of the card 10 into the case 50.

Figure 8A:
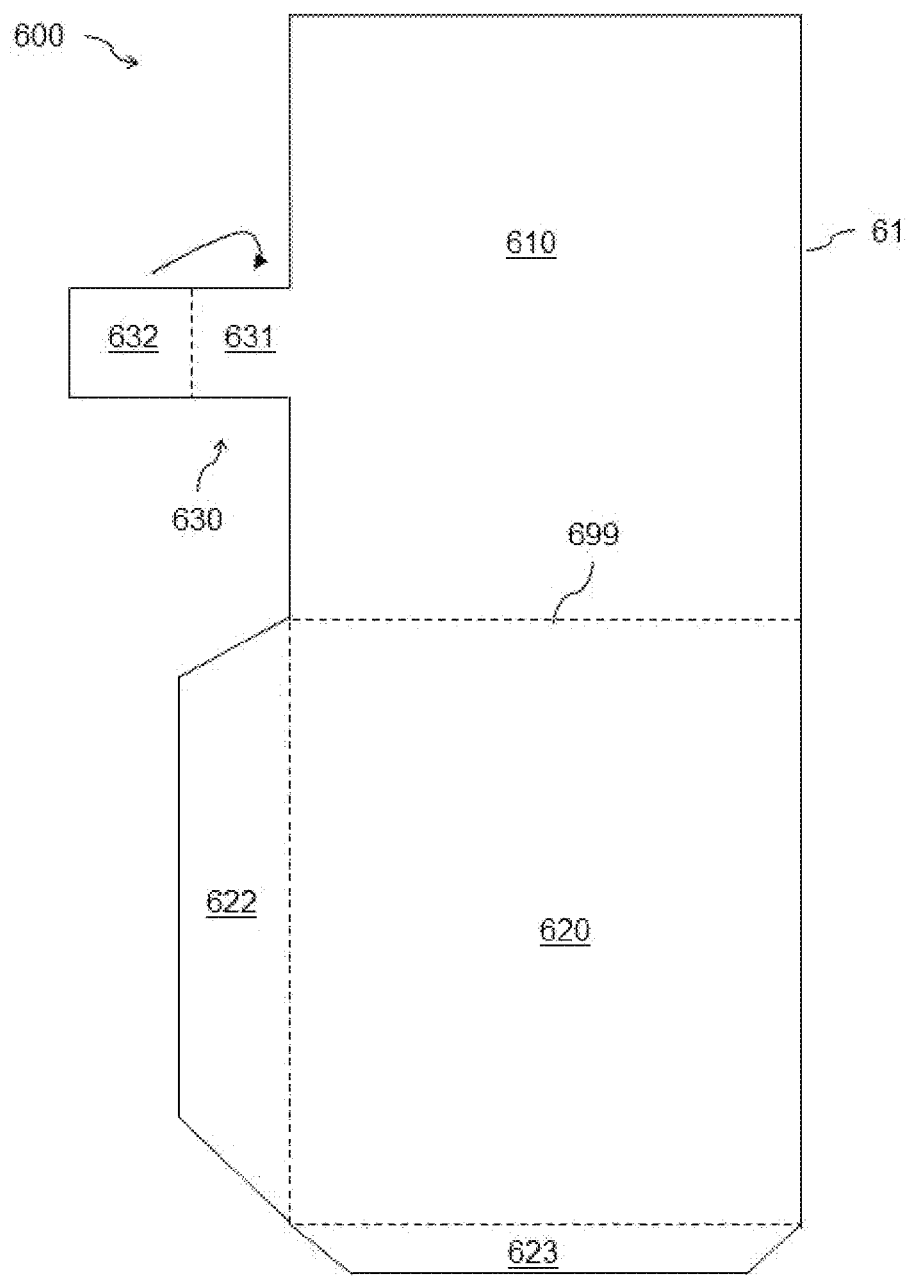
FIG. 8a illustrates the cut-out of a blank for the manufacture according to one embodiment of the invention of an enrolment case without guide flap at the hinge between the panels forming the faces of the case.
Figure 8B:
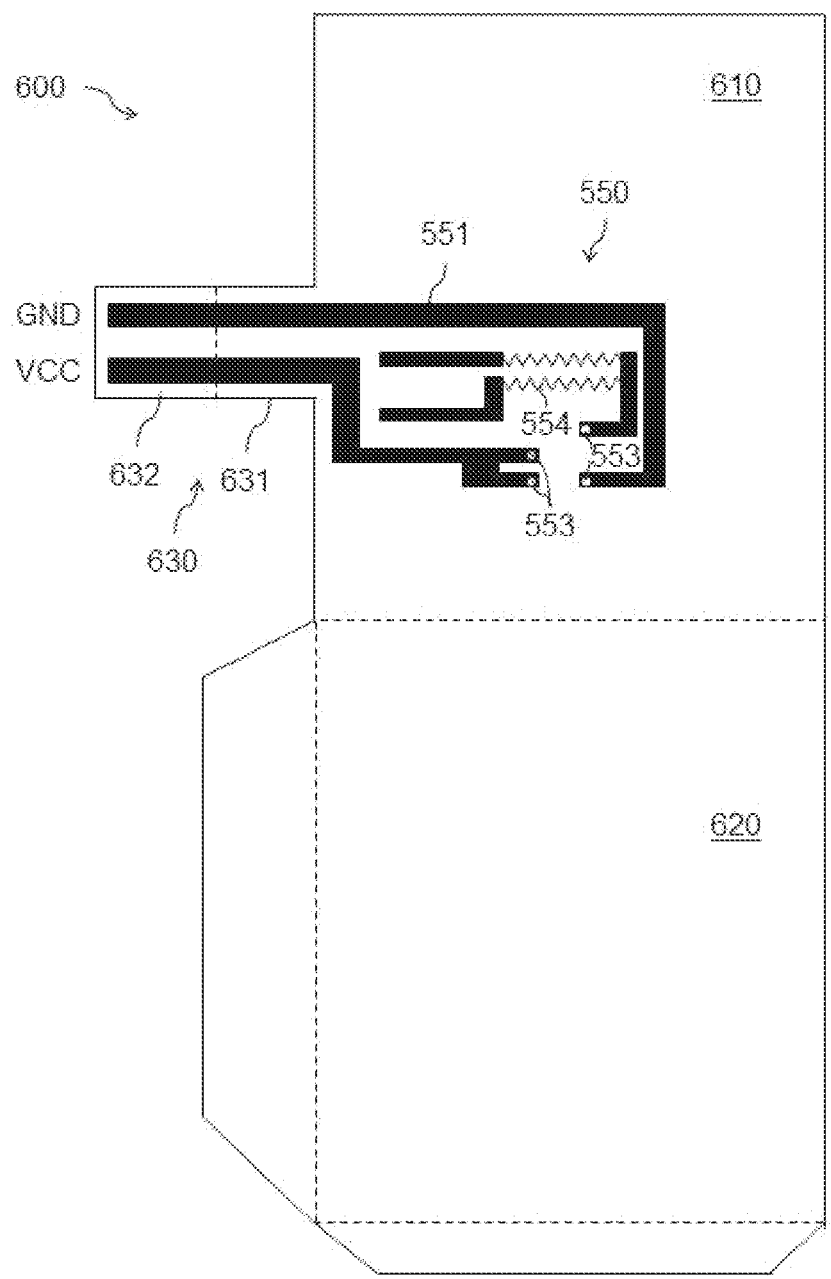
FIG. 8b illustrates the printing of conductive track portions on the blank of FIG. 8a for the manufacture of the enrolment case.
Figure 8C:
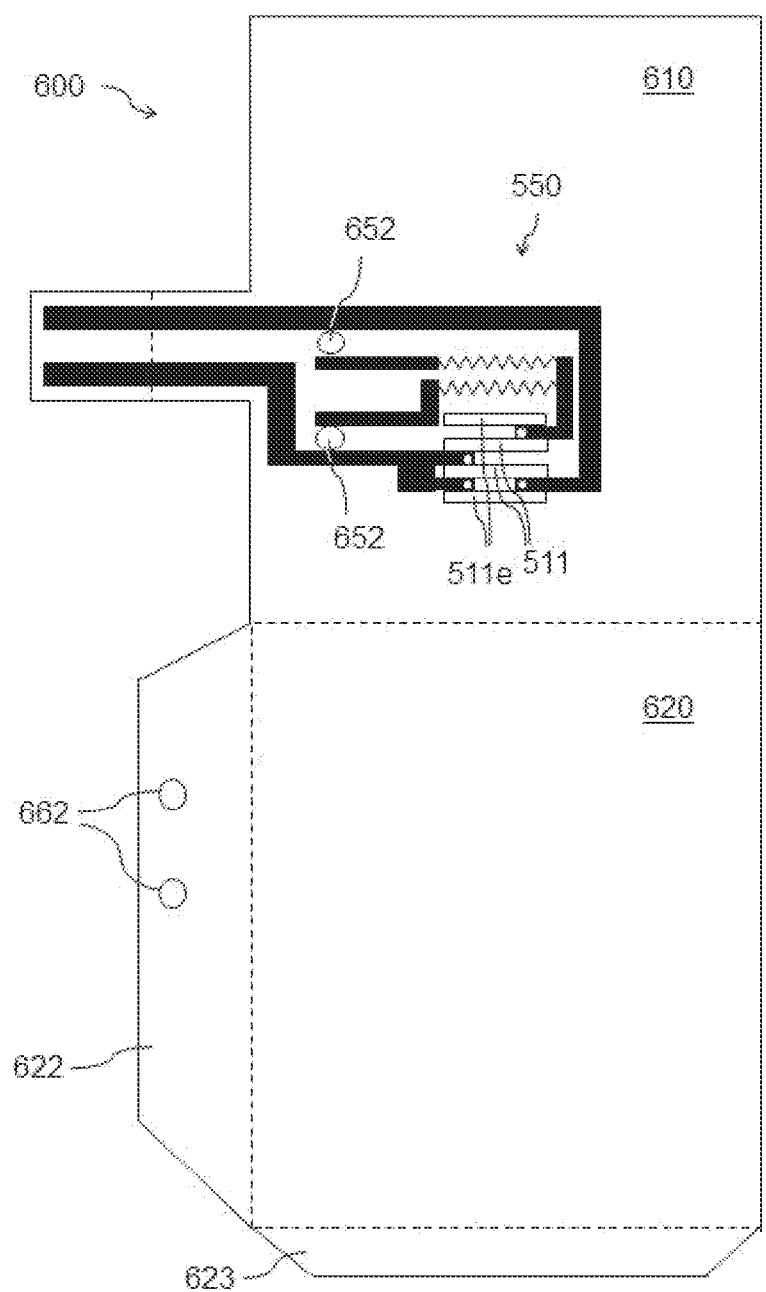
FIG. 8c illustrates the production of openings in the blank of FIG. 8b for the manufacture of the enrolment case in the configuration of FIG. 7.
Figure 8D:
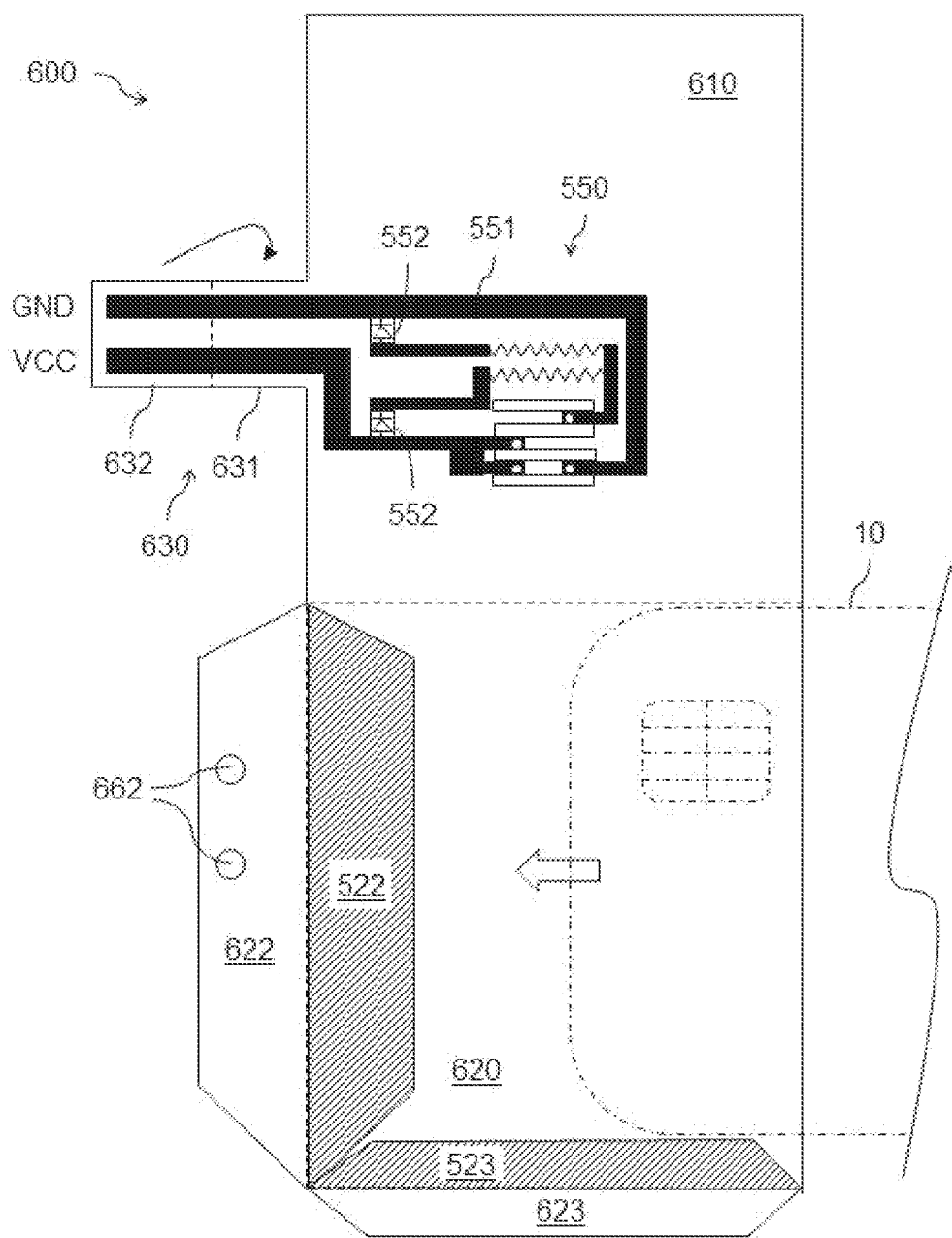
FIG. 8d illustrates the installation of electronic components on the blank of FIG. 8c and its folding and gluing for the manufacture of the enrolment case.
Figure 10:
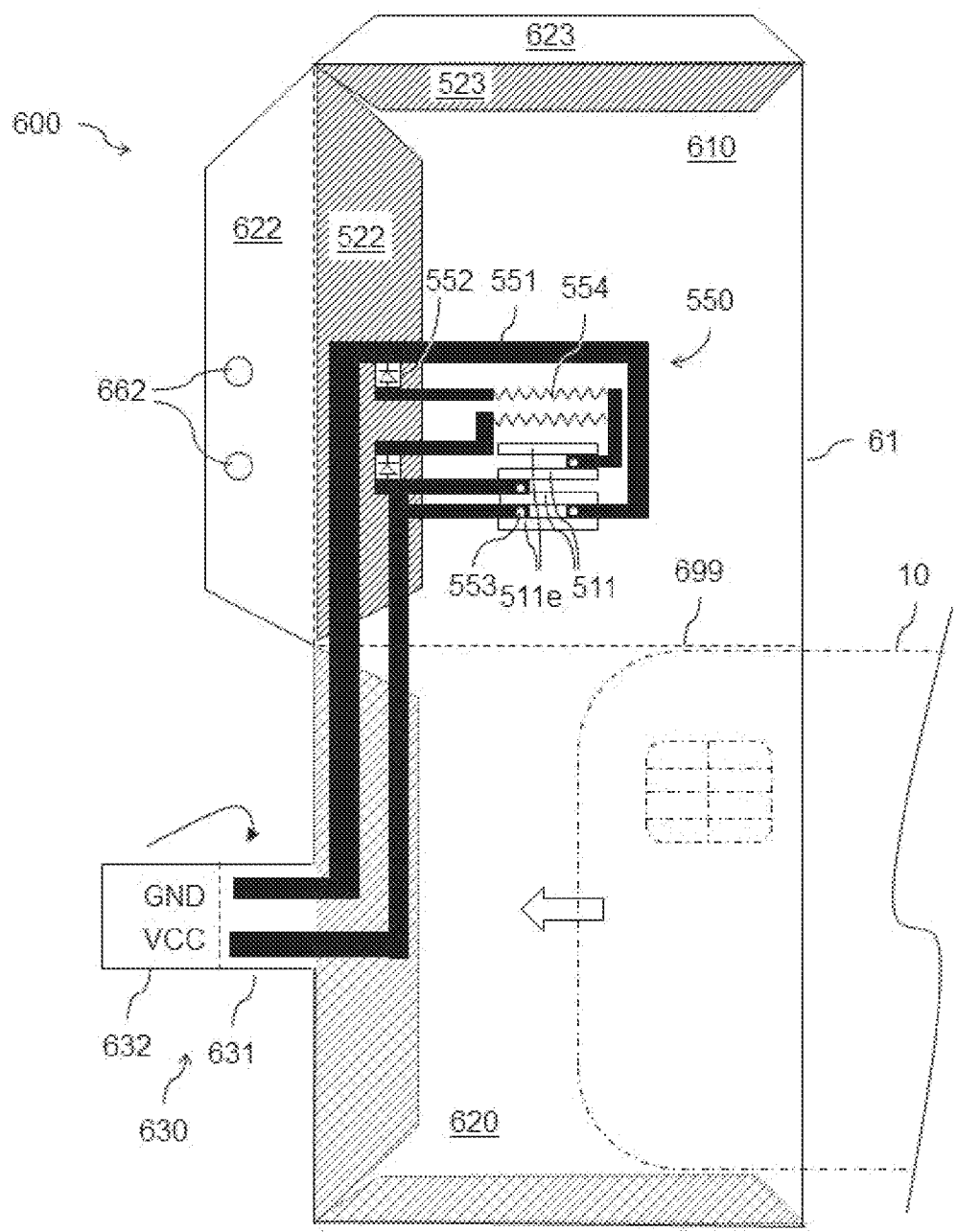
FIG. 10 illustrates one variant of the blank for an enrolment case of FIG. 8d.

FIG. 10 illustrates another embodiment which is both:
one variant of FIG. 8d to obtain the case 50 of FIG. 7. The tab 630 is provided to be connected to the second panel 620 requiring the extension of the track portions VCC and GND on the internal face of this second panel; and
one variant of FIG. 9 in the case where the flap 621 is omitted.

Again, the different steps corresponding to FIGS. 6a/8a to 6c/8c are not represented to simplify the presentation. However, they are deduced in the light of FIG. 10.

The fold 699 serves as a guide for the card 10 when it is introduced through the slot 51, instead of the flap 621.

Figure 11A:
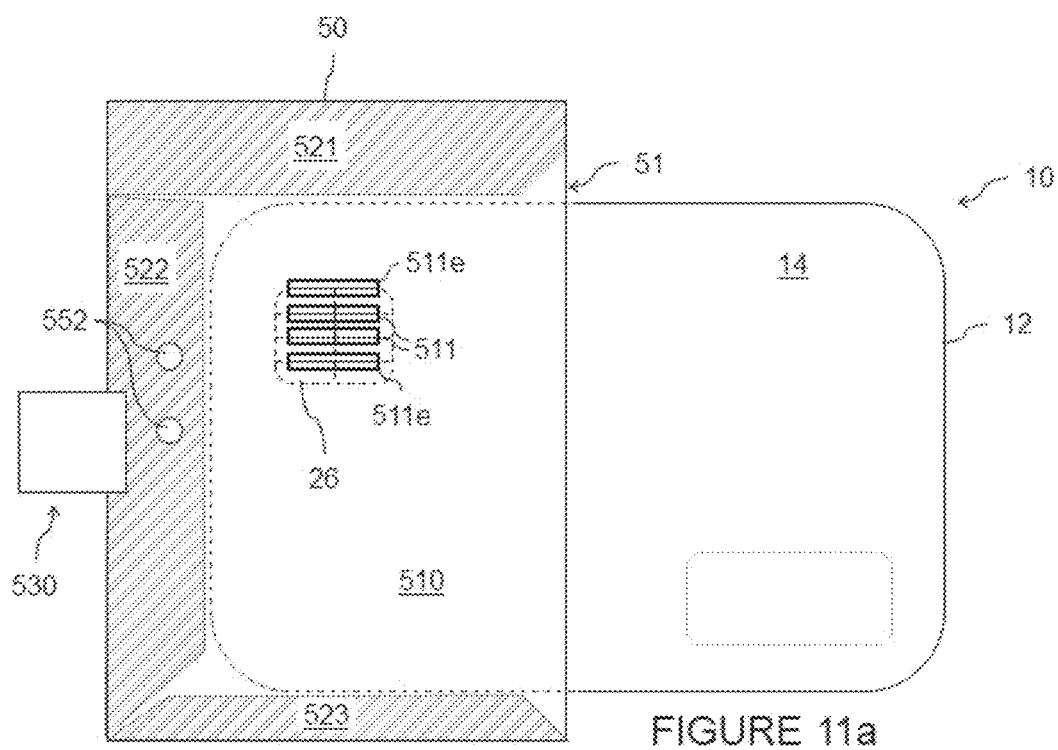
FIG. 11a FIG. 11a illustrates, in rear view, another embodiment of an enrolment case adapted to a smart card according to FIG. 2.
Figure 11B:
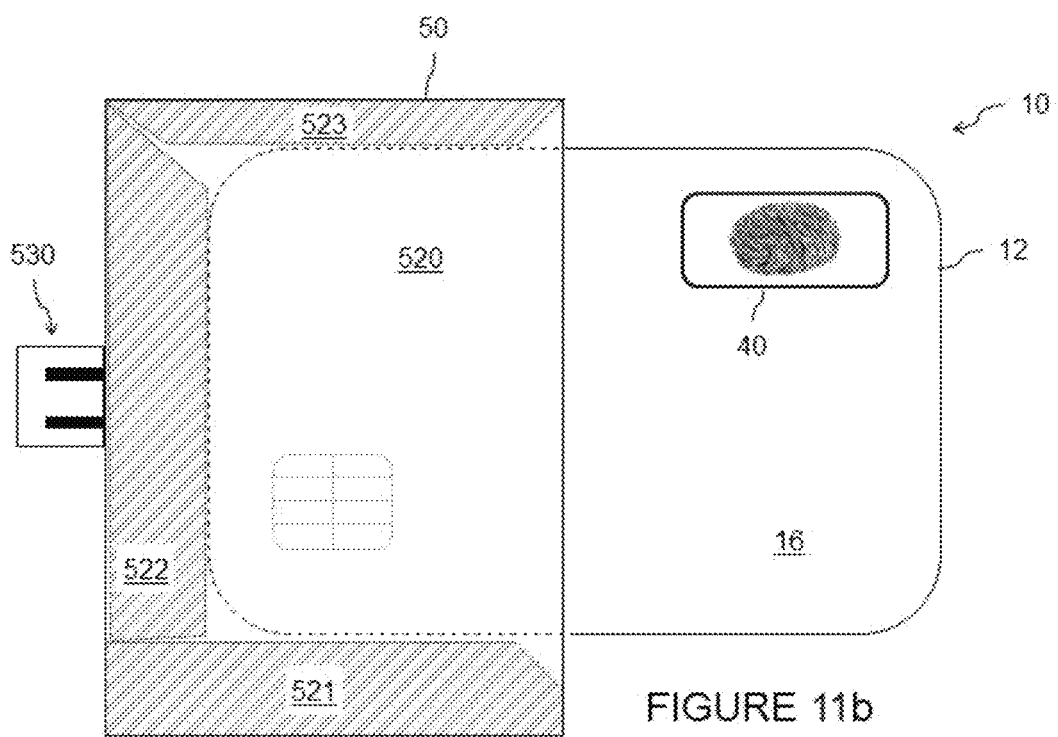

FIGS. 11a and 11b illustrate another embodiment of a case 50 for use with a card according to FIG. 2, i.e. provided with a biometric sensor 40 on the lower face 16 (opposite to that 14 carrying the contacts 26).

The ends of the track portions VCC and GND are provided on the same side of the case 50 as the one where the biometric sensor 40 of the card 10 will be accessible once the latter is inserted (FIG. 11b).

In the illustrated example, the diodes 552 are visible on the other side of the case 50 (FIG. 11a). In one variant, the diodes 552 are visible on the same side as the biometric sensor 40, the one represented in FIG. 11b.

Figure 12:
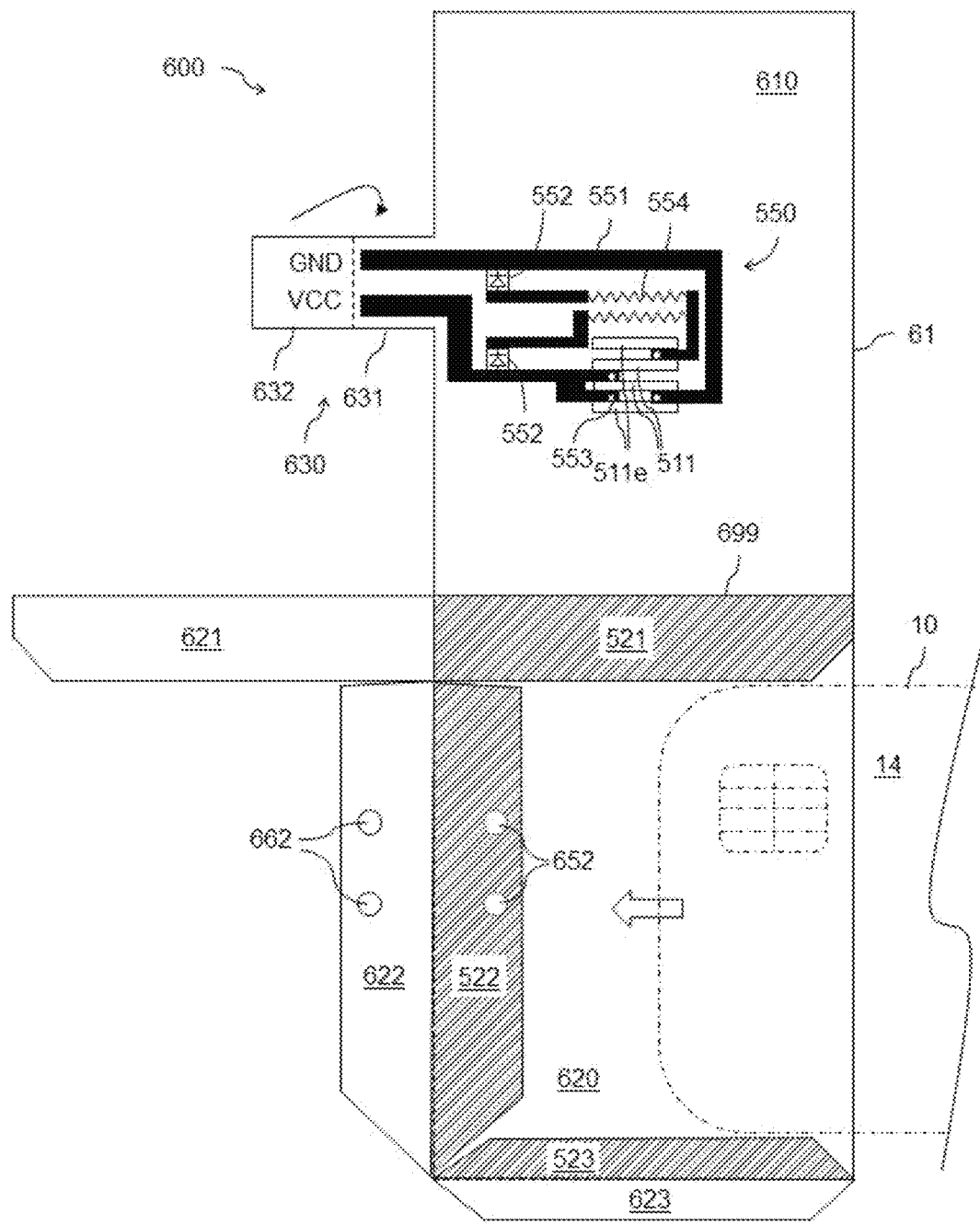
FIG. 12 illustrates an example of a blank for an enrolment case of FIGS. 11a and 11b, in a final state before folding and gluing.

FIG. 12 illustrates one example of a blank 600 corresponding to the case of FIGS. 11a and 11b. This Figure represents the blank during the last step of constituting the case 50. Again, the various prior steps corresponding to FIGS. 6a/8a to 6c/8c are not represented to simplify the presentation. However, they are deduced in the light of FIG. 12.

Advantageously, the electrical circuit 550 is deposited on only one face of a single panel, here the first panel 610. As visible in the Figure, the electrical circuit is compact. The conductive track portions 551 do not pass through any folding area, reducing the risks of malfunction.

In one variant for having the diodes 552 on the face of the case 50 oriented toward the user when the latter sees the biometric sensor 40, the perforations 652 can be made in the second panel 620 (and not in the first panel) and the diodes 552 can be turned over to engage these perforations of the second panel 620 when the case 50 is closed. These perforations are illustrated by dashed white circles.

The flaps 621 and 623 can be interchangeably connected, hinged, to the first panel 610 or to the second panel 620 (as illustrated). The flaps 621 and 623 comprise in particular beveled ends on the side of the edge 61 forming a slot 51 (as previously described), in order to facilitate the insertion of the card 10 into the case 50.

The flap 621 is optional. In its absence, the fold 699 serves as a guide for the card 10 when it is inserted into the case 50.

FIGS. 10 and 12 are applicable for the manufacture of a case comprising an arrangement of openings other than the one illustrated (four openings as in FIG. 5c), in particular the arrangements of FIGS. 5a (no opening), 5b, 5d and 5e.

The foregoing examples are only embodiments of the invention which is not limited thereto.

In particular, the above examples are based on the use of a single cardboard blank 600 (or the same) to form, by folding and gluing, the case 50. In one variant, the case 50 may be constituted by the gluing of several independent cardboard parts (or the same), with possible folds.

While some opening arrangements 511 are described and illustrated, the invention is applicable to other arrangements, including openings of same dimensions or of different dimensions.

The invention claimed is:

1. A case for a smart card, the case comprising:
an envelope made of cellulosic fiber material dimensioned such that the smart card is configured to be inserted through a slot defined within the envelope, the envelope comprising two adjacent and hinged panels of a folded blank forming two faces of the envelope, and an electrical circuit directly deposited on the cellulosic fiber material, the electrical circuit being configured to electrically connect electrical contacts of the smart card to a power supply interface when the smart card is inserted into a first position within the case.

2. The case according to claim 1, wherein the electrical circuit is disposed on an internal face of the envelope, the power supply interface having a portion external to the envelope.

3. The case according to claim 1, wherein the electrical circuit includes a plurality of contact studs arranged in one or more contact positions of a matrix pattern to make electrical contact with the inserted smart card, the envelope including at least one through-opening disposed between two of the one or more contact positions of the matrix pattern.

4. The case according to claim 3, wherein the envelope includes a plurality of openings, each of the openings being arranged between two successive rows of the matrix pattern carrying the contact studs.

5. The case according to claim 4, wherein the envelope further includes one or more end openings arranged externally to the entire matrix pattern carrying the contact studs.

6. The case according to claim 4, wherein the matrix pattern is formed of two columns of four lines in accordance with the standard ISO/IEC 7816-2: 2007.

7. The case according to claim 3, wherein the envelope further includes one or more end openings arranged externally to the entire matrix pattern carrying the contact studs.

8. The case according to claim 7, wherein the matrix pattern is formed of two columns of four lines in accordance with the standard ISO/IEC 7816-2: 2007.

9. The case according to claim 3, wherein the matrix pattern is formed of two columns of four lines in accordance with the standard ISO/IEC 7816-2: 2007.

10. The case according to claim 1, wherein the electrical circuit consists of one or more conductive track portions deposited on the envelope, and one or more components forming a user interface.

11. The case according to claim 1, wherein the envelope made of cellulosic fiber material is formed in one part.

12. The case according to claim 1, wherein the envelope includes a guiding system configured to guide the smart card toward the first position, the guiding system formed by flaps fixing together a front panel and a back panel of the envelope.

13. The case according to claim 12, wherein the flaps have a beveled edge on a side of the slot.

14. The case according to claim 2, wherein the electrical circuit includes a plurality of contact studs arranged in one or more contact positions of a matrix pattern to make electrical contact with the inserted smart card, the envelope including at least one through-opening disposed between two of the one or more contact positions of the matrix pattern.

15. The case according to claim 1, wherein the electrical circuit consists of one or more conductive track portions deposited on the envelope, and one or more components forming a user interface.

16. A blank made of cellulosic fiber material for a case for a smart card, the blank comprising: two adjacent and hinged panels configured to form two faces of the case dimensioned such that the smart card is configured to be inserted through a slot defined within the case, wherein an electrical circuit is disposed directly on the cellulosic fiber material of at least a first one of said two panels, the electrical circuit including, on the first panel, contact studs configured to electrically connect electrical contacts of the smart card to a power supply interface when the card is inserted into a first position in the case.

17. The blank according to claim 16, wherein the contact studs are disposed in one or more contact positions of a matrix pattern and configured to make electrical contact with the smart card inserted into the first position, and the first panel includes at least one opening arranged between two of the contact positions of the matrix pattern.

18. The blank according to claim 16, wherein the first panel includes a plurality of openings, each of the openings being arranged between two successive rows of the matrix pattern carrying the contact studs, and one or more end openings are arranged externally to the entire matrix pattern carrying the contact studs.

19. A system comprising:
a smart card equipped with a biometric sensor provided on the surface of the card; and a case for a smart card, the case including: an envelope made of cellulosic fiber material dimensioned such that the smart card is configured to be inserted through a slot defined within the envelope, the envelope comprising two adjacent and hinged panels of a folded blank forming two faces of the envelope, and an electrical circuit directly deposited on the cellulosic fiber material, the electrical circuit being configured to electrically connect electrical contacts of the smart card to a power supply interface when the smart card is inserted into a first position within the case, wherein the biometric sensor is accessible from the outside of the case when the smart card is inserted into the first position.

20. A method for manufacturing a case for a smart card, the method comprising: forming a blank made of cellulosic fiber material, the blank comprising two adjacent and hinged panels configured to form two faces of the case dimensioned such that the smart card is configured to be inserted through a slot defined within the case, an electrical circuit being deposited directly on the cellulosic fiber material of at least a first one of said panels, the electrical circuit including, on the first panel, contact studs connected to a power supply interface; and obtaining the case by folding and gluing the blank so that the contact studs electrically connect electrical contacts of the smart card to the power supply interface when the card is inserted into a first position in the case.

* * * * *